US008866745B1

(12) United States Patent
Schrick

(10) Patent No.: US 8,866,745 B1
(45) Date of Patent: *Oct. 21, 2014

(54) SYSTEM AND METHOD FOR PROVIDING A TOUCH INPUT INTERFACE FOR INFORMATION COMPUTING AND CONTROL DEVICES

(71) Applicant: Brad Schrick, Bingen, WA (US)

(72) Inventor: Brad Schrick, Bingen, WA (US)

(73) Assignee: Brad Schrick, Bingen, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,671

(22) Filed: Jul. 16, 2013

Related U.S. Application Data

(63) Continuation-in-part of application No. 13/544,974, filed on Jul. 9, 2012, which is a continuation of application No. 10/385,818, filed on Mar. 10, 2003, now Pat. No. 8,245,158.

(60) Provisional application No. 60/363,165, filed on Mar. 11, 2002, provisional application No. 61/672,207, filed on Jul. 16, 2012, provisional application No. 61/682,667, filed on Aug. 13, 2012.

(51) Int. Cl.
*G06F 3/02* (2006.01)
*G06F 3/023* (2006.01)

(52) U.S. Cl.
CPC ..................................... *G06F 3/023* (2013.01)
USPC ........... 345/168; 345/156; 345/160; 345/169; 715/864; 715/710; 715/764; 715/768; 715/780

(58) Field of Classification Search
USPC .......... 345/160, 168, 864, 156, 169; 715/864, 715/710, 764, 768, 780
See application file for complete search history.

(56) References Cited

U.S. PATENT DOCUMENTS

| | | | |
|---|---|---|---|
| 3,940,758 | A | 2/1976 | Margolin |
| 4,378,553 | A | 3/1983 | McCall |
| 4,495,490 | A | 1/1985 | Hopper et al. |
| 4,911,565 | A | 3/1990 | Ryan |
| 5,044,798 | A | 9/1991 | Roylance et al. |
| 5,122,786 | A | 6/1992 | Rader |
| 5,197,811 | A | 3/1993 | Levinrad |
| 5,278,779 | A | 1/1994 | Conway |
| 5,351,066 | A | 9/1994 | Rucker et al. |

(Continued)

OTHER PUBLICATIONS

Handykey (http://www.handykey.com/site/t2side.html), 1 page, Oct. 23, 2001.

(Continued)

*Primary Examiner* — Olga Merkoulova
(74) *Attorney, Agent, or Firm* — Brad Schrick

(57) ABSTRACT

A system and method for providing a touch input interface for information, computing and control devices. In accordance with an embodiment, the systems and methods described herein, in a high level conceptual embodiment, can be used to provide interface devices and methods that naturally and organically present a preview of the action that will take place, if and only if the element (or elements) of the interface that is (are) currently indicated, is (are) definitely commanded by further confirmation. Otherwise the state of the device will be maintained, and the display will be restored to its previous state if no such action is taken, and/or if the indication is removed or changed. In most embodiments, the feedback is to be presented in a natural way that does not distract, such as in the line of sight.

4 Claims, 19 Drawing Sheets

(56) References Cited

U.S. PATENT DOCUMENTS

| | | | |
|---|---|---|---|
| 5,365,606 | A | 11/1994 | Brocker et al. |
| 5,426,449 | A | 6/1995 | Danziger |
| 5,457,452 | A | 10/1995 | Skovronski |
| 5,497,151 | A | 3/1996 | Dombroski |
| 5,502,460 | A | 3/1996 | Bowen |
| 5,515,305 | A | 5/1996 | Register et al. |
| 5,564,560 | A | 10/1996 | Minelli et al. |
| 5,613,786 | A | 3/1997 | Howell et al. |
| 5,661,505 | A | 8/1997 | Livits |
| 5,667,319 | A | 9/1997 | Satloff |
| 5,674,180 | A | 10/1997 | Yabe et al. |
| 5,675,329 | A | 10/1997 | Barker et al. |
| 5,717,431 | A | 2/1998 | Chia-Ying et al. |
| 5,745,056 | A | 4/1998 | Takahashi et al. |
| 5,754,395 | A | 5/1998 | Hsu et al. |
| 5,764,180 | A | 6/1998 | Cummings |
| 5,767,463 | A | 6/1998 | Gandre |
| 5,775,822 | A | 7/1998 | Cheng |
| 5,790,103 | A | 8/1998 | Willner |
| 5,847,697 | A | 12/1998 | Sugimoto |
| 5,861,872 | A | 1/1999 | Stohr et al. |
| 5,874,906 | A | 2/1999 | Willner et al. |
| 5,880,715 | A | 3/1999 | Garrett |
| 5,892,499 | A | 4/1999 | Vulk, Jr. |
| 5,902,257 | A | 5/1999 | Korth |
| 5,917,476 | A | 6/1999 | Czerniecki |
| 5,936,555 | A | 8/1999 | Zagnoev |
| 5,941,648 | A | 8/1999 | Robinson et al. |
| 5,949,401 | A | 9/1999 | Kazarian |
| 5,995,026 | A * | 11/1999 | Sellers .................. 341/34 |
| 6,005,496 | A | 12/1999 | Hargreaves et al. |
| 6,031,469 | A | 2/2000 | Dodd |
| 6,056,458 | A | 5/2000 | Lin |
| 6,057,788 | A | 5/2000 | Cummings |
| 6,073,036 | A | 6/2000 | Heikkinen et al. |
| 6,088,022 | A | 7/2000 | Rakoski |
| 6,102,594 | A | 8/2000 | Strom |
| 6,127,949 | A | 10/2000 | Dodd |
| 6,132,118 | A | 10/2000 | Grezeszak |
| 6,144,551 | A | 11/2000 | Kao |
| 6,147,858 | A | 11/2000 | Takahashi |
| 6,153,843 | A | 11/2000 | Date et al. |
| 6,168,331 | B1 | 1/2001 | Vann |
| 6,188,917 | B1 | 2/2001 | Laureanti |
| 6,189,056 | B1 | 2/2001 | Ogura et al. |
| 6,198,053 | B1 | 3/2001 | Chou |
| 6,215,419 | B1 | 4/2001 | Leman |
| 6,218,966 | B1 | 4/2001 | Goodwin et al. |
| D442,591 | S | 5/2001 | Bailly |
| 6,297,752 | B1 | 10/2001 | Ni |
| 6,680,677 | B1 * | 1/2004 | Tiphane .................. 341/22 |
| 6,693,626 | B1 | 2/2004 | Rosenberg |
| 6,723,937 | B2 | 4/2004 | Engiemann et al. |
| 6,803,905 | B1 | 10/2004 | Capps et al. |
| 6,882,337 | B2 | 4/2005 | Shetter |
| 6,909,424 | B2 | 6/2005 | Liebenow et al. |
| 7,131,780 | B2 | 11/2006 | Hirsch |
| 7,805,022 | B2 | 9/2010 | Tanaka |
| 8,245,158 | B1 * | 8/2012 | Schrick .................. 715/864 |
| 2002/0118175 | A1 * | 8/2002 | Liebenow et al. ........ 345/168 |
| 2003/0056278 | A1 | 3/2003 | Kuo et al. |
| 2006/0053387 | A1 | 3/2006 | Ording |

OTHER PUBLICATIONS

Filewalker Product Description, PDA Designed for One-Handed Use: INVAIR Presents the Future of the PDA, www.invair.de, printed on Aug. 20, 2003.

Peterson, R., Keyboard Kraziness & Mouse Madness: A Week of Wacky Input Devices, www.extremetech.com, Apr. 21, 2003.

Wearden, G., Users Get a Grip on One-Handed Linux PDA, www.zdnet.com, Mar. 15, 2002.

IBM Corporation, User System Ergonomic Research on the Half-Keyboard Computer, www.almaden.ibm.com, printed Jun. 26, 2001.

Matias Corporation, Product Information on the halfkeyboard™ including Matias Half Keyboard—How It Works, Matias Wearable Half Keyboard and Matias Half Keyboard Research, www.halfkeyboard.com, printed Jun. 26, 2001.

Matias, E. et al., "A Wearable Computer for Use in Microgravity Space and Other Non-Desktop Environments," Companion of the CHI '96 Conference on Human Factors in Computing Systems, New York, ACM, pp. 69-70, 1996.

Matias, E. et al., "One-Handed Touch-Typing on a QWERTY Keyboard," Human Computer Interaction, vol. 11, pp. 1-27, 1996.

Matias, E. et al., Half-QWERTY: Typing With One Hand Using Your Two-Handed Skills, Companion of the CHI '94 Conference on Human Factors in Computing Systems, ACM, New York, pp. 51-52, 1994.

Matias, E. et al., Half-QWERTY: A One-Handed Keyboard Facilitating Skill Transfer From QWERTY, Proceedings of the INTERCHI '93 Conference on Human Factors in Computing Systems, ACM, New York, pp. 88-94, 1994.

Think Outside Product Information on the Stowaway™ Portable Keyboard, www.thinkoutside.com, printed Jun. 27, 2001.

Kerr et al., Apple Patent App: Touch Sensitive iPod with Multiple Touch Sensitive Surfaces, www.hrmpf.com, 8 pages, Sep. 8, 2006.

Cook, Apple Patents Touch Sensitive Bezel for User Interface, www.ipodobserver.com, 5 pages, Oct. 27, 2006.

Sellers, Apple Files Patent for Multipoint Touchscreen for Table PC, iPod, More, www.macimmunews.com, 6 pages, May 11, 2006.

O'Grady, Apple Patent Describes New Interface for iPod, www.powerpage.org, 5 pages, Oct. 27, 2006.

Lane, Apple Filing Reveals Multi-Sided iPod with Touch Screen Interface, AppleInsider, 4 pages, May 10, 2007.

Ording, Apple's Touchscreen Virtual Keyboard Interface, www.hrmpf.com, 11 pages, Mar. 9, 2006.

Apple, Introducing the Wireless Mighty Mouse, www.apple.com, 2 pages, Mar. 2, 2009.

Topolsky, Microsoft R&D Strikes Again: the Lucid Touch, www.engadget.com, 3 pages, Aug. 24, 2007.

Hafner, Now Preening on the Coffee Table: The TiVo Remote Control, New York Times, 6 pages, Feb. 19, 2004.

Lombardi, Virtual Keyboard Tops Apple Patent Requests, CNET News, 2 pages, Apr. 28, 2006.

* cited by examiner

Figure 1a
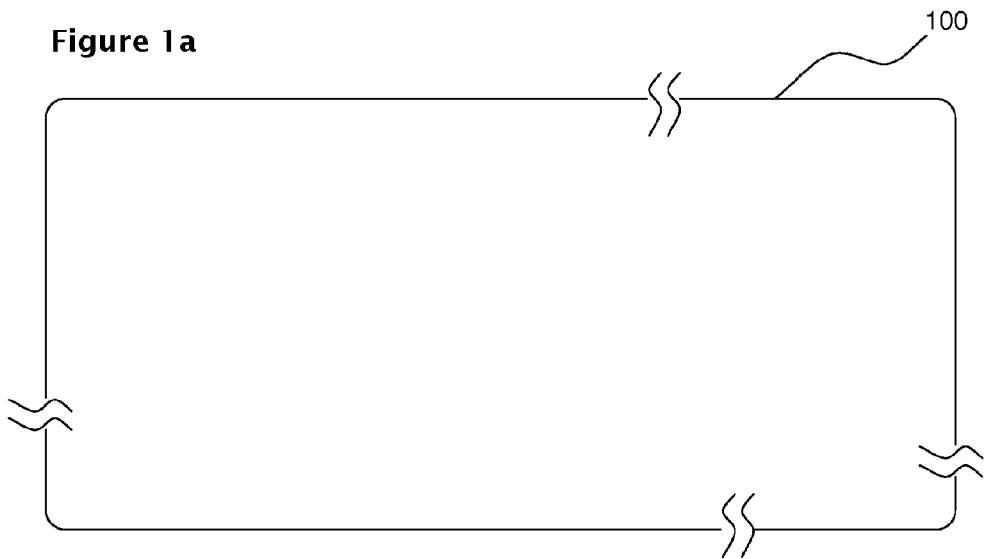
Figure 1b
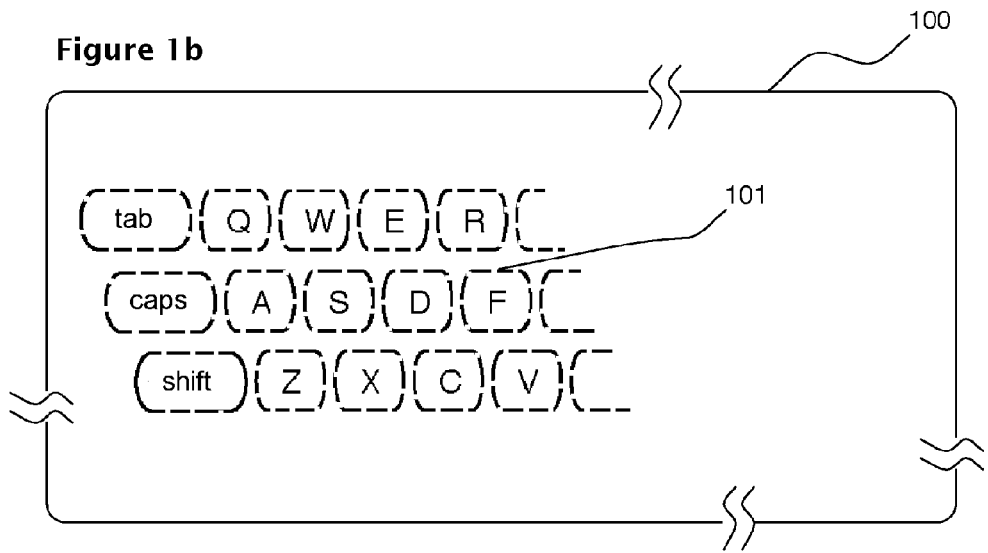
Figure 1

Figure 2

Figure 3a
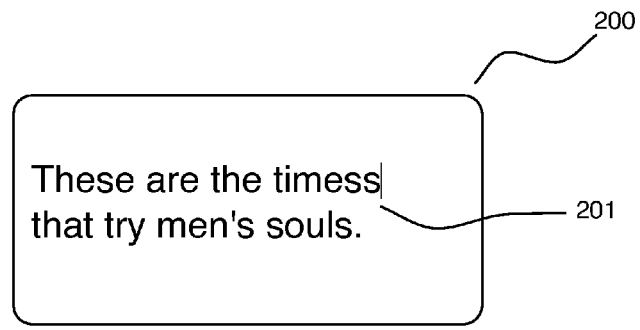
Figure 3b
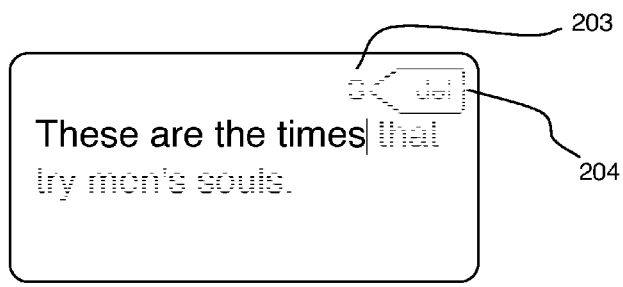
Figure 3c
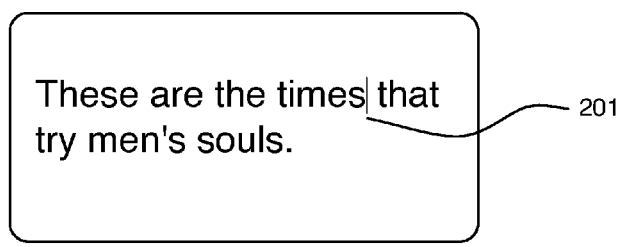
Figure 3

Figure 4a
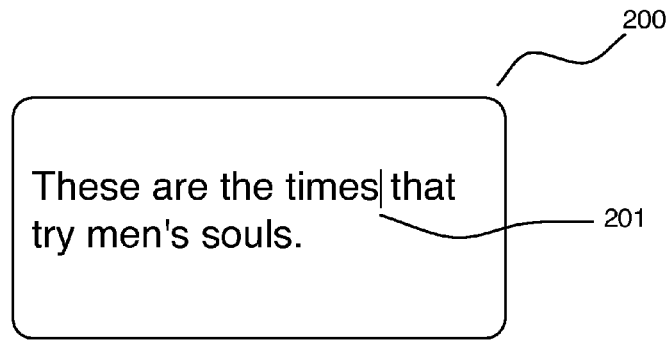
Figure 4b
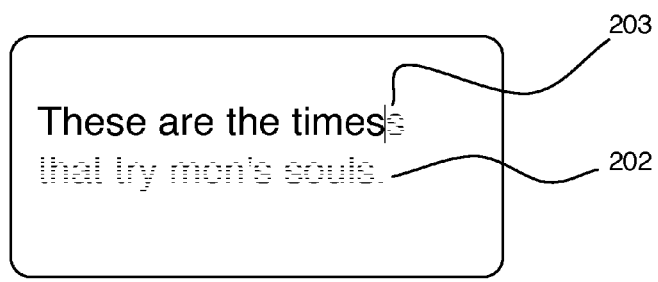
Figure 4c
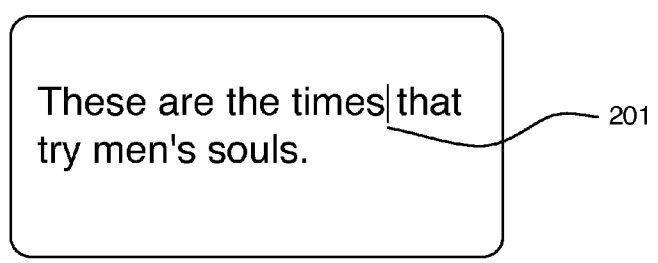
Figure 4

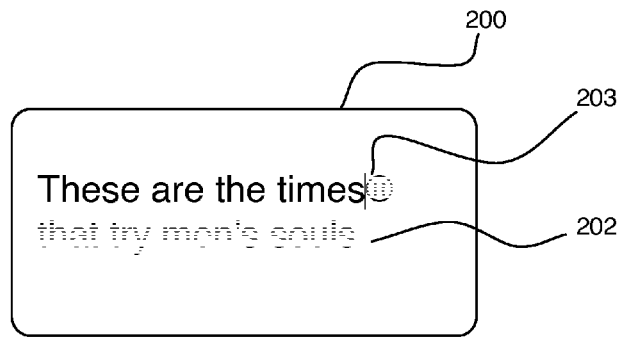
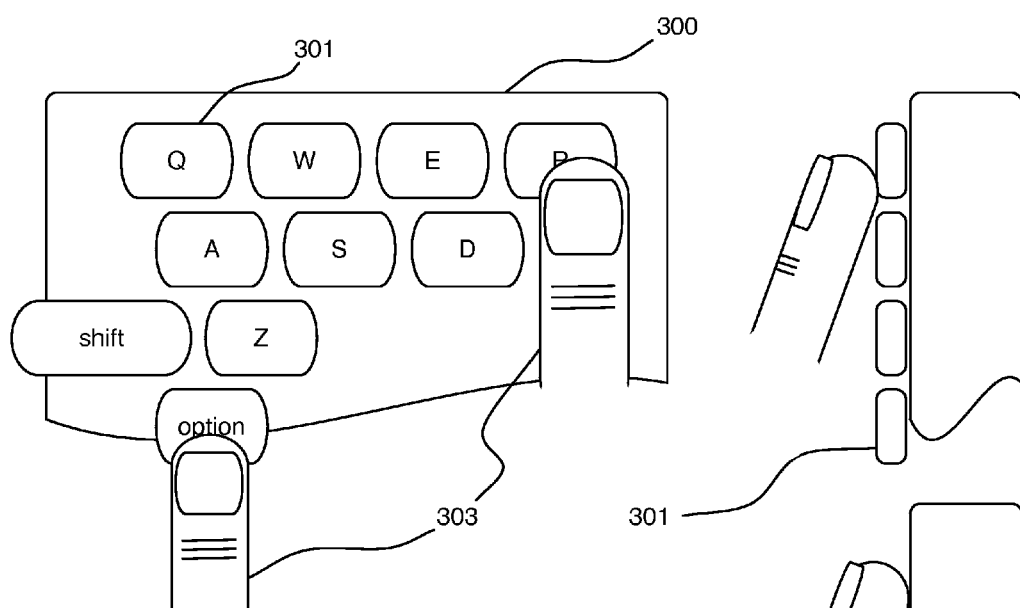
Figure 5a
Figure 5b
Figure 5

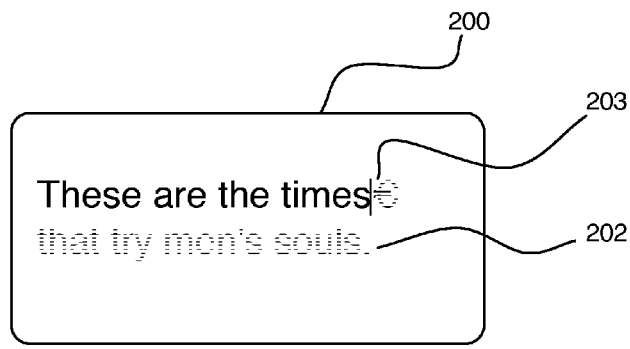
Figure 6a
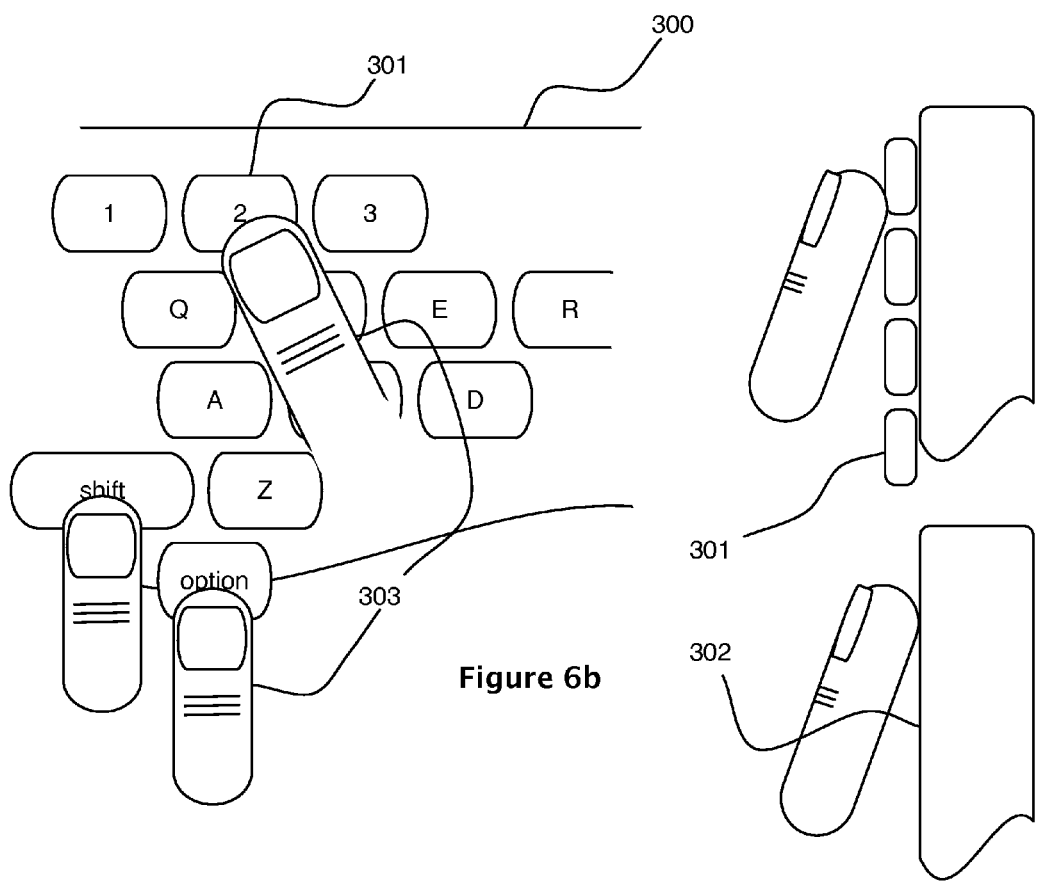
Figure 6b
Figure 6

Figure 13a
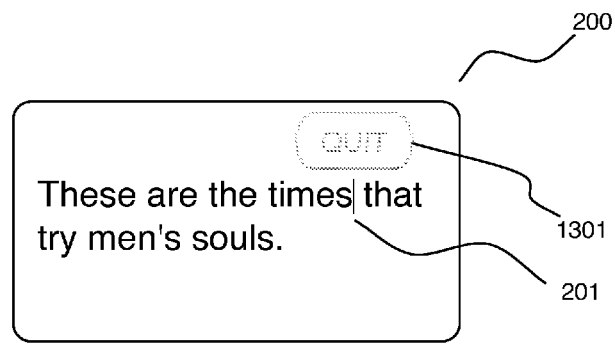
Figure 13b
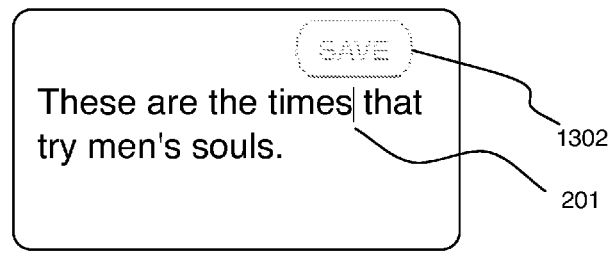
Figure 13c
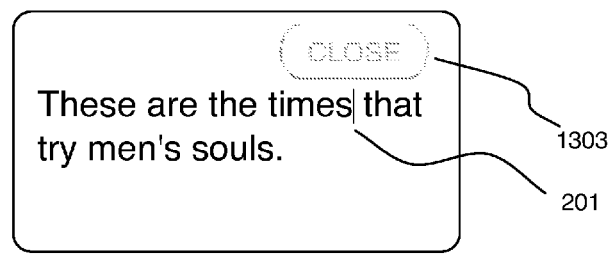
Figure 13

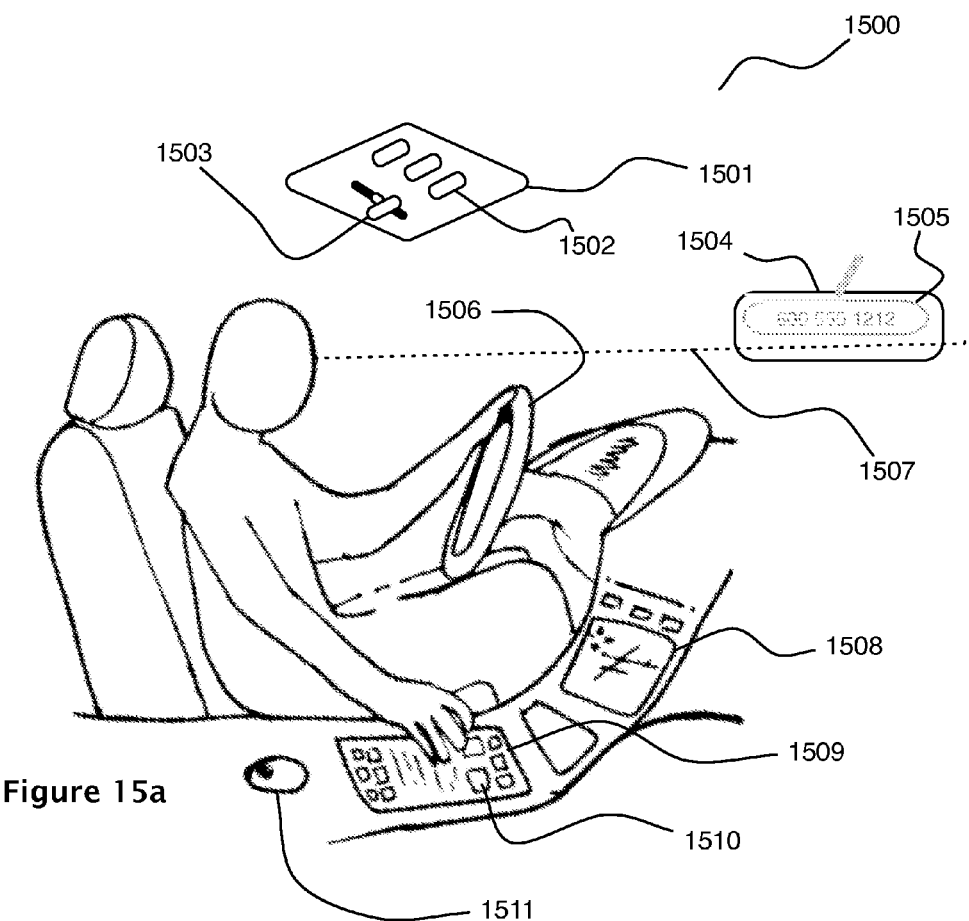
Figure 15a
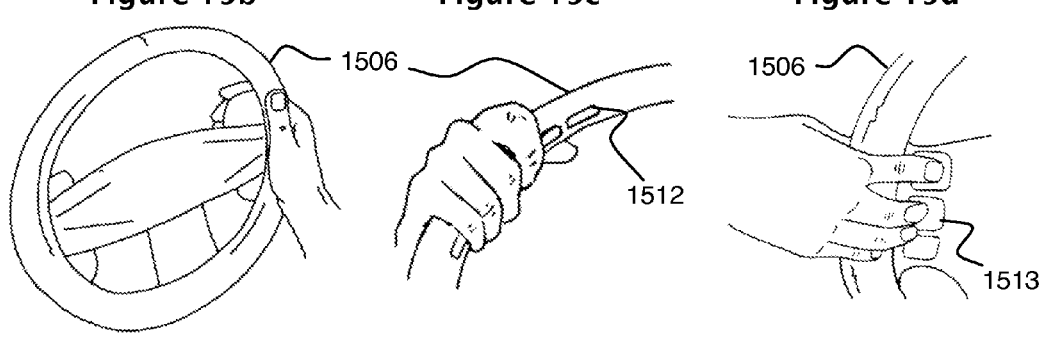
Figure 15b    Figure 15c    Figure 15d
Figure 15

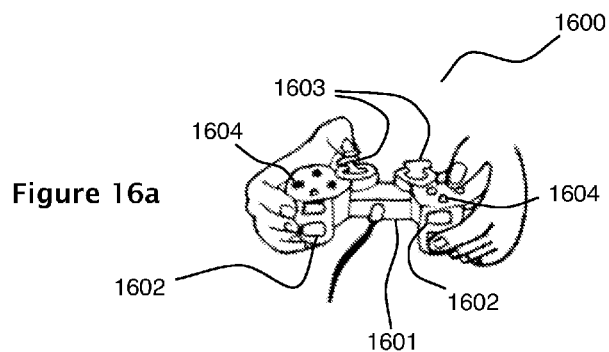
Figure 16a
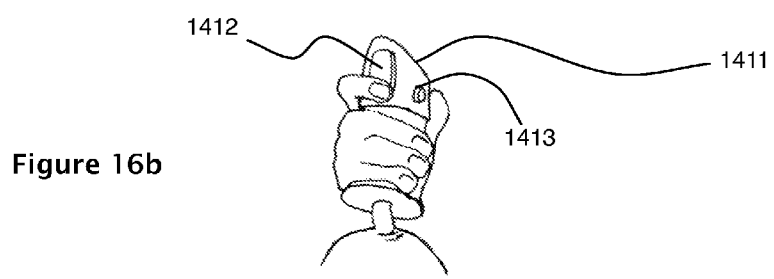
Figure 16b
Figure 16

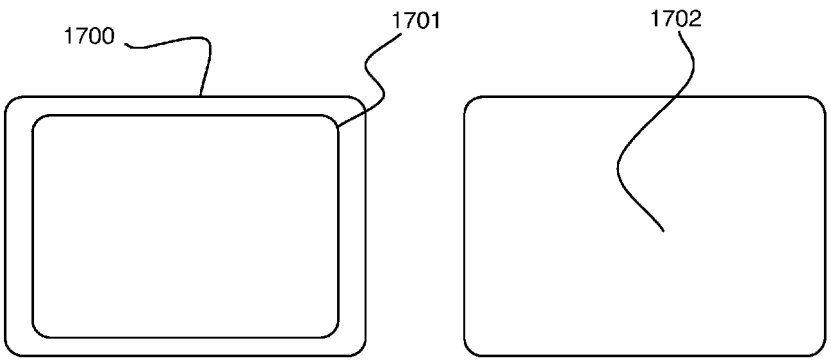
Figure 17a  Figure 17b
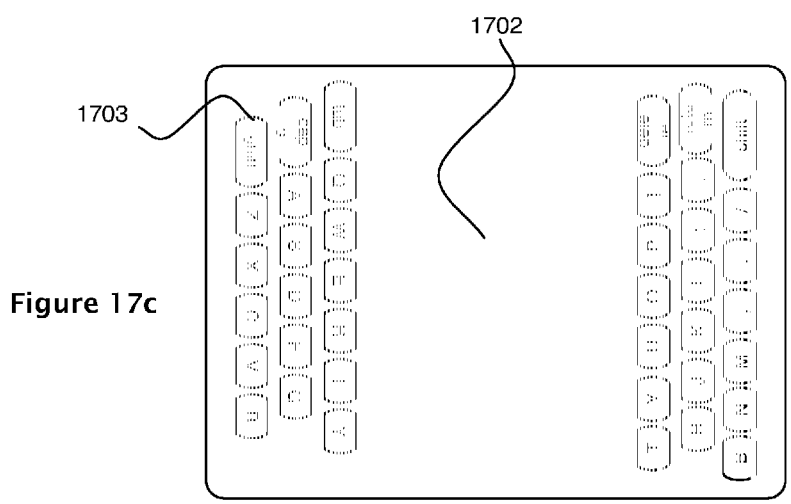
Figure 17c
Figure 17

SYSTEM AND METHOD FOR PROVIDING A TOUCH INPUT INTERFACE FOR INFORMATION COMPUTING AND CONTROL DEVICES

CLAIM OF PRIORITY

This application is a continuation-in-part of U.S. Patent Application titled "SYSTEM AND METHOD FOR PROVIDING A KEYBOARD TYPE INTERFACE FOR A COMPUTING DEVICE", application Ser. No. 13/544,974, filed Jul. 9, 2012, which is a continuation of U.S. patent application Ser. No. 10/385,818, filed Mar. 10, 2003, which claims the benefit of priority to U.S. Provisional Application No. 60/363,165, filed Mar. 11, 2002; and also claims the benefit of priority to U.S. Provisional Application No. 61/672,207, filed Jul. 16, 2012, and U.S. Provisional Application No. 61/682,667, filed Aug. 13, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the invention are generally related to human-machine interfaces, and are particularly related to an interface for a computing device, in itself or as an element of a system.

SUMMARY

A system and method for providing a touch input interface for information, computing and control devices. In accordance with an embodiment, the systems and methods described herein, in a high level conceptual embodiment, can be used to provide interface devices and methods that naturally and organically present a preview of the action that will take place, if and only if the element (or elements) of the interface that is (are) currently indicated, is (are) definitely commanded by further confirmation. Otherwise the state of the device will be maintained, and the display will be restored to its previous state if no such action is taken, and/or if the indication is removed or changed. In most embodiments, the feedback is to be presented in a natural way that does not distract, such as in the line of sight.

BRIEF DESCRIPTION OF THE DRAWINGS

FIG. 1 is a schematic representation of a touch sensitive trackpad 100 of sufficient size with the capacity to detect and transmit the locations of multiple simultaneous touches, and to transmit the locations of multiple simultaneous touch confirmations, in accordance with an embodiment.

FIG. 3 is a representation of the progressive sequence of one example of character deletion in a representation of a document displayed on a personal computing device screen 200, in accordance with an embodiment.

FIG. 4 is a representation of the progressive sequence of one example of character hunting with the prospective character retracted, in a representation of a document displayed on a personal computing device screen 200, in accordance with an embodiment.

FIG. 5 is a diagram of the potential input of two key character insertion in a representation of a document displayed on a personal computing device screen 200, using a keyboard that has physical keys 301 or a touch input surface 302, in accordance with an embodiment.

FIG. 6 is a diagram of the potential input of three key chordal character insertion in a representation of a document displayed on a personal computing device screen 200, using a keyboard that has physical keys 301 or a touch input surface 302, in accordance with an embodiment.

FIG. 13 is an illustration of preview feedback provided on a display for prospective input actions, in these cases 'QUIT,' 'SAVE,' and 'CLOSE', in accordance with an embodiment.

FIG. 15 is an illustration of a driver in an automotive cabin with some of the associated controls and displays, in accordance with an embodiment. In addition, potential placement of buttons, touch pads, or key input on the back of the steering wheel is presented.

FIG. 16 shows two common forms of computer game controllers, in accordance with an embodiment, one held by two hands with a number of addition buttons and controls, and the other like the pilot's flight control side stick as shown in FIG. 15, also with additional discrete controls.

FIG. 17 is a schematic illustration of a tablet computer with a touch surface on its back side, in accordance with an embodiment, with a nominal partial representation of a virtual keyboard as it would be perceived if visible.

DETAILED DESCRIPTION

Figure 2A:
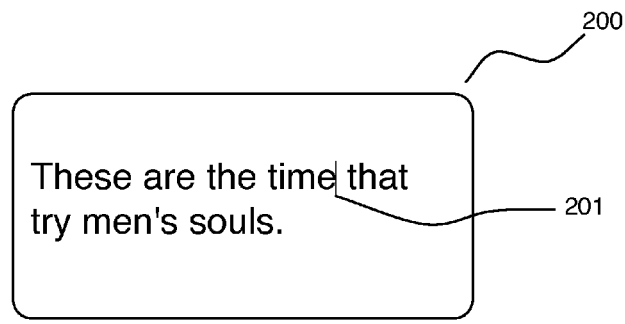
FIG. 2 is a representation of the progressive sequence of one example of character insertion in a representation of a document displayed on a personal computing device screen 200, in accordance with an embodiment.

Today personal computing devices are more ubiquitous than ever, all around the world. From minuscule personal medical monitors, to music players, to hand held games, to laptop computers with extra large screens that substitute for desktop computers, personal information devices are based on microprocessor computing technologies with comparable software operating systems at all scales. The sales volume of these devices has increased significantly every year, with totals in the billions, for a current world population estimated at about 7 billion and growing. At the same time, almost every product, vehicle, or other system that can benefit has incorporated computer controls and information systems, with associated interfaces and displays.

Originally, keyboards and keypads with physical buttons and trackball or computer 'mouse' technologies provided the human interfaces to use, command and control the great majority of these devices. The first portable computers used keyboards little changed from desktop models, and the first portable wireless telephones and then cell phones used variations on keypads that seemed little changed from the button keypads first used widely in push button phones in the 1970s.

Sometime since then, microwave ovens and other appliances employed touch panels using various technologies to accept key input shown in small displays. For the most part these were mechanically based, under a sealed waterproof panel. Manufacturing control systems have used sealed touch input panels for ruggedness and flexibility for many years.

New methods for directing and commanding these devices are brought to market every year. It is now possible to command a device with spoken words, or eye movements, and potentially thought patterns. Remote controls for televisions have proliferated, in parallel with an explosion of hand held remote computer game controllers that include buttons, dials, joysticks, sliders, touch pads and related electromechanical apparatuses for sending commands to the game system displayed with sound on the television, computer, or game console screen.

Over the past decades, touch input has become more prevalent and widespread than ever before. For example, the Newton personal digital assistant (PDA) used a stylus to write and draw directly on a screen and select commands. This kind of interface developed into one that would accept touch input from a finger, using a variety of sensors and structures including capacitive and resistive sensors arranged in transparent layers or as trackpads for directing a mouse cursor. Selection was indicated by mechanical switches arranged under the pad, or by separate button, touch or pressure actions.

Recently, touch screen mobile phones have proliferated that rely principally on finger touch actions on virtual keys and buttons to send input data and commands to the phone's operating system and software applications.

Some input to personal computing devices is accepted from gestures, spoken word and phrase recognition, styluses, and physical buttons, and from contextual knowledge such as accelerometers and location sensors, but key and button input continues to be essential for a successful and useful device for personal information, computing, communications, entertainment, or related purposes.

For all of these input systems and methods, two problems have persisted. First, even on a device as small as a mobile phone it is not possible to see which button or key the operator is touching at the same time as the input area where the character will appear. Second, therefore, without looking away at the keyboard, button or other control touched, confirming a key or button is the only way to detect which key or action the operator is touching. These problems relate to the narrow foveal field of view that characterize the human eye, which has only a very few angular degrees of high resolution sight, sometimes estimated as a 2 degree high resolution field of view. The systems and methods described herein are advantageous for almost all keyboards, keypads and other manual input, because it is almost always inconvenient, distracting, or impossible to simultaneously see with sufficient clarity both the input region that the operator is working to modify or control, and the keyboard, keypad or controls, real or virtual. This can be as simple as a virtual keyboard displayed on a small personal device screen adjacent to a text input area, or a keyboard for a personal computer that is in the normal places, or perhaps is held on the lap or even under a table surface, or otherwise removed from clear view. It can also be as complex as remote robotic control or teleoperation, such as robotically assisted remotely operated surgical systems.

Figure 19:
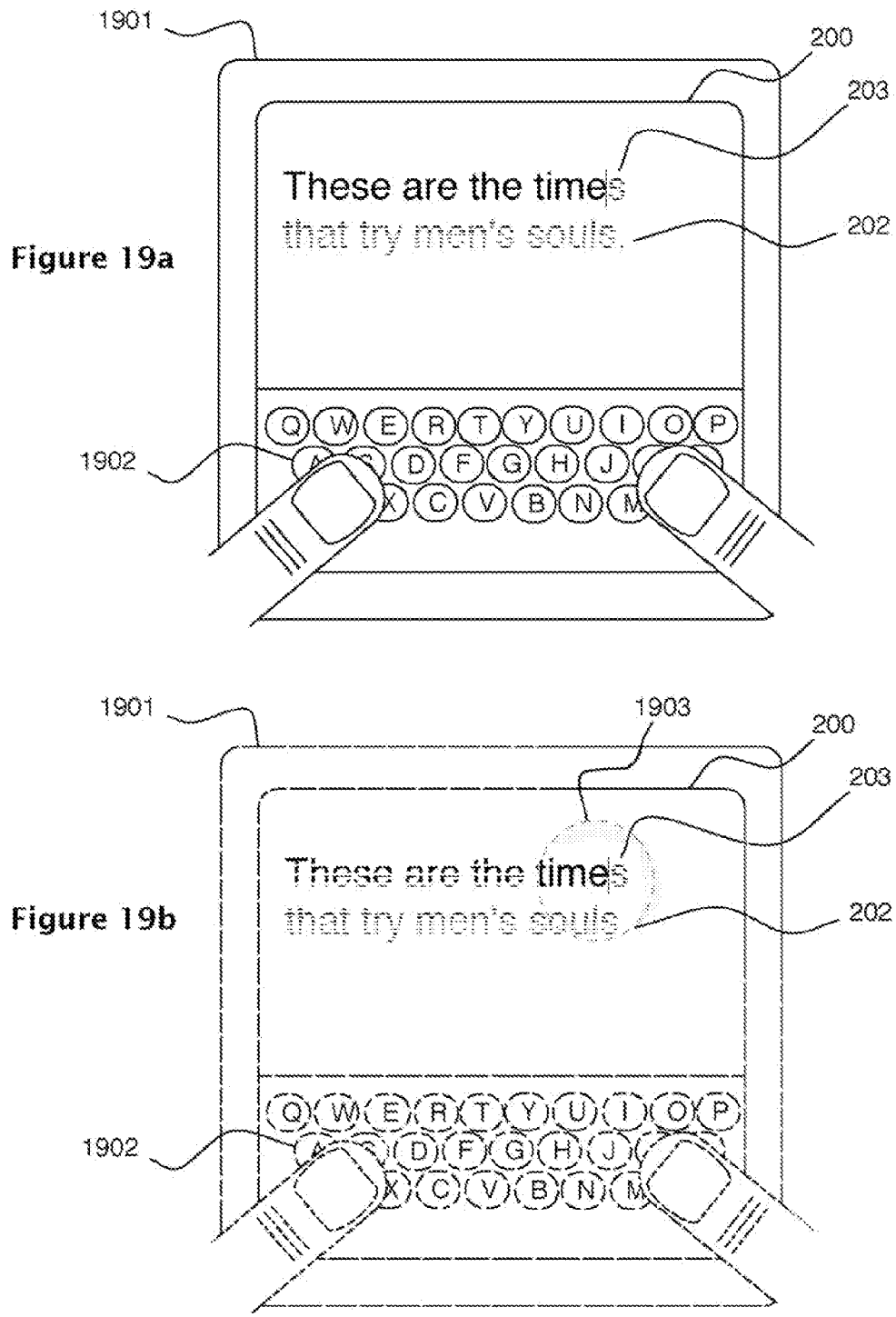
FIG. 19 is a notional illustration of the restricted focus available to the human eye, as it might be perceived while typing on a small mobile touch screen device with an on screen keyboard, in accordance with an embodiment.

As illustration, in FIG. 19, a small mobile touch screen computing device 1901 is shown in FIG. 19*a*, with display 200 and virtual keys 1902. The character 's' 203 has been indicated but not entered. FIG. 19*b* shows a notional representation of the focus area 1903, with the rest of the device and fingers obscured by lack of detail and focus.

A related opportunity is to simplify design, with resultant benefits in cost, manufacturing complexity, technical and customer support, inventory and repair, and related aspects of owning and operating the device. To these ends, the fewer parts required to make a complete and satisfying product, the better. In a keyboard or keypad, there are many discrete moving parts, and reducing these is desirable. To some extent this is accomplished in many devices by onscreen touch keyboards and keypads. But these take up a great percentage of the available display space, while only using a very small percentage of that precious resource for any given keystroke. If the advantages could be retained, while returning the display space for content and other productive purposes, it would be a significant advance over the current state of the art.

Touch typists watch the cursor on the screen, which is provided at the current input position in the representation of a document on the display, to show where a character will be entered. This gives feedback on their key selections, after the fact. If an error is made, it can be corrected, usually by deletion or selection and typing over the errors, but this requires multiple keystrokes to enter the correct character.

It would be better if the characters could be entered or actions commanded with confidence and without error.

'Hunt and peck' is the usual jargon for looking at a keyboard to find a character to enter, or function to perform, and then selecting and confirming that key or keys, while necessarily taking eyes off of the display and the content, search, or controls area where the character will be entered or the action will be reflected. Such an action could for instance be stopping or quitting an application using key entry. (As an example of a command, to quit a software application the multiple key combination command-Q is simultaneously pressed on a Macintosh, and similar key combinations are available in Windows and other operating systems and user interfaces for the same purpose.)

Likewise, in a wide variety of modern environments, an operator in the role of driver, pilot, engineer, stenographer, or similar occupation takes discrete actions to direct the system under their control, often using a key or button type actuator apparatus to select the action. At other times the control is in the form of a slider, dial, knob, switch, or related mechanisms, real or virtual, long familiar to the art.

At times, such an action can be critical and/or crucial but, once commanded, irreversible or difficult to reverse. For instance, a military pilot may press a button to fire a weapon. A commercial pilot may press a button to command a fuel dump, or an engine cut off, or disengage an autopilot. A car driver might be distracted while looking at a touch screen to make a phone call or query a navigation system. A game player may choose the wrong object or door in the virtual world she is navigating. Many such actions can be retracted or aborted, it is true, but only at a cost.

A driver may enter a wrong phone number, or a wrong address. A surgeon operating a remotely controlled surgical system in situ may command an injection or incision at the wrong time, or of the wrong magnitude or kind. If these kinds of actions, including key input for typing, could be done with more confidence, it would be an improvement in each system, and analogous systems that can benefit from the systems and methods described herein.

Touch screen interfaces are now used ubiquitously in mobile phones, automobiles, aircraft cockpits, industrial controls, kiosks of all kinds including maps for area directories and directions, and information, game, entertainment and computing devices, and medical monitoring and treatment systems, to name only a few. Some systems overlay visual cues and information over the operator's view through glasses or devices that create displays on lenses or directly on the retina, superimposing a screen overlay or other visual cues on the real view as seen by the operator. The most ubiquitous such devices in the current era may be 'heads up displays' as used in military and civilian aircraft cockpits, and some automotive cabins, which usually strive to present information focused at the natural focal distance of attention while operating the vehicle, in order to minimize distraction.

Most of these visual touch interfaces include virtual buttons or related virtual inputs, that is visual action controls that are drawn on a screen and exist only in their visual representation, and which are manipulated by touch or gesture. In some systems, these controls and gestures may be 'in the air,' as an outside observer would perceive them, to affect conceptual structures that exist only in the mind's view of the operator, or are represented by the action of objects drawn on the screen, for instance in an electronic computer game, or perhaps a simulation of flying, driving, or otherwise moving through a virtual scene that exists only in computer memory.

Many touch screen interfaces can change their controls over a period of time. This is a fundamental and powerful advantage of a touch screen interface, such as a mobile phone touch screen, an industrial controls input screen, a navigation screen for an automobile or aircraft that can switch, for instance, to a screen to control cabin environments, or engine parameters, and so on. Mechanical key inputs also often have multiple modes and purposes, for instance standard keyboard keys.

But variation of a control's purpose also increases the chances that an error will be committed.

A system and method that increased confidence and certainty in the selection and specification of actions, critical or mundane, without significantly interfering with the normal flow of action and/or expected behavior, would be a welcome improvement in the state of the art.

Likewise, physical button controls can change their function depending on the context. For instance, the function of a power button function can be Power On when the device is off, and Power Off when the device is on. If other buttons on a remote control or keyboard could change their function in a natural or organic way, without confusing the operator, it would be advantageous in several dimensions, including design simplicity, lower manufacturing costs, lower distribution costs, and lower inventory and stocking cost and complexity. For instance, a keyboard might be made that changes the language that it enters, allowing an operator to switch languages, or multiple people to use the device, each in their native language. Potentially, a company might stock one keyboard that adapts to the customer, rather than many that are pre-configured to enter only one language. This would reduce costs and complexity dramatically for each constituency from the company itself, to customers, to manufacturers, and retailers, while increasing utility and value.

In the same vein, a remote control device might be made that changes the functions of its buttons and touch input areas in natural and intuitive ways, such that the device is at once simpler and more useful.

A key insight in this set of innovations is the use of methods that enhance input systems and apparatuses without interfering with the expected functions and functionality that have evolved and developed over time, creating standards of form, position, behavior and action that are productive precisely because they are standards. Time tested and organically evolved in the marketplace, it is to be remembered and respected that keyboards, remote controls, game controllers, cockpit and cabin controls, and related interfaces work well now. Improvements are wanted, but not if it means subtraction of successful methods and apparatuses.

In accordance with an embodiment, methods and apparatuses are described that simultaneously 1) do not steal substantial display screen real estate or otherwise distract for key input, including character input, multi-key character input, function and command input, and multi-key function and command input (for instance control-alt-delete in the Windows operating system to reboot, or chordal multi-key input for character sets); 2) give intuitive informative feedback for the action about to be taken, in a non-destructive preview form that indicates what will be changed, without yet actually changing those things or commanding the change to be recorded, entered, conducted, or otherwise committed; 3) do not distract from the focus of concentration, whether it is the word being formed in a document on the screen, a search term in a search field, playing a game, driving a car, piloting a plane, watching a camera view during a robotic or remotely operated surgical procedure, adjusting rates and flows in a manufacturing automation system, and/or similar and related activities; and 4) which do not commit or change the state of the system until positive confirmation is received, usually in the normal and usual way that would be used if the methods and apparatuses desired were not inserted and embedded into the system. Further, 5) the system should naturally and simply remove or revise the preview of impending action at the appropriate time, after the indicated control is changed or the indication removed.

In accordance with an embodiment, the systems and methods described herein, in a high level conceptual embodiment, provides an interface device and method that naturally and organically presents a preview of the action that will take place, if and only if the element (or elements) of the interface that is (are) currently indicated, is definitely commanded by further confirmation, and which will restore the device and display to its previous state if no such action is taken, and/or if the indication is removed. Indicated here usually means touch, close proximity, or fractional displacement, but could mean other actions or conditions that amount to the same thing, for example motions made to effect changes in a virtual environment.

For instance, in accordance with an embodiment, a physical keyboard with discrete keys may be provisioned with touch pads on each key, such that a preview of the character indicated by the key touched is presented to the operator, before any action is committed. Only if the key is fully depressed, will the character be confirmed and entered.

This also holds for touch keypads and keyboards, whether on a separate touch surface or rendered and displayed on a touch screen, with distinct keys indicated by screen images or by indicia on the touch keypad surface. As will be described, it also holds for undifferentiated touch pads used as keypads or keyboards, with keys implied by position and found by touch or proximity with preview feedback.

FIG. 1 is a schematic representation of a touch sensitive trackpad 100 of sufficient size with the capacity to detect and transmit the locations of multiple simultaneous touches, and to transmit the locations of multiple simultaneous touch confirmations, in accordance with an embodiment. FIG. 1a shows the trackpad in a view as seen by the operator, with no differentiating or distinguishing marks. FIG. 1b shows the trackpad with a partial set shown of virtual keys, shown in ghosted hashed form in the regions as they would be sensed by the system and methods described here.

Figure 2B:
Figure 2C:
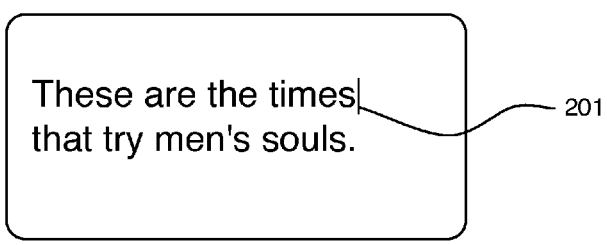

FIG. 2 is a representation of the progressive sequence of one example of character insertion in a representation of a document displayed on a personal computing device screen 200 in accordance with an embodiment. In FIG. 2a the input cursor 201 is shown at the point of insertion. In FIG. 2b the operator has touched the 's' key or touched for instance the region of a track pad provisioned as the 's' key, as in FIG. 1b. The 's' character to be provisionally inserted is shown here in a hashed form, together with the following characters 202 that will be shifted if the character 's' is confirmed. In FIG. 2c, the lower case character 's' has been confirmed, and the text has been shifted and rendered in normal form, waiting for the next key stroke.

In one of the simplest cases, in accordance with an embodiment a single finger will touch a single key, real or virtual, and that character will be presented, at the cursor in the display of the document being edited, but in a ghosted or otherwise impermanent form, indicating that the action has not yet been taken.

In the same vein, but slightly more complicated example, in accordance with an embodiment if a character is to be inserted in the midst of a text, which would create a shift in the text following that character, that entire shift may be indicated in a ghosted, shimmering, colored, or otherwise impermanent form. Only if the key is confirmed by normal and natural operation of the keyboard will the character be entered and the text rendered in normal form.

In accordance with an embodiment, in a related situation, if the delete key is touched or otherwise indicated per this system and method, a character or image at the cursor about to be deleted may be shown ghosted or otherwise indicated in non persistent representation, with an indication of the delete key also presented with impermanent cues, and if desired the resultant changes in the document can be presented, preferably with consistent cues that the change is impermanent and awaiting confirmation. If the action or character, in this case character deletion, is not confirmed or the indication, for instance touch of the delete key, is removed, the display will be restored to represent and render the current state of the document.

FIG. 3 is a representation of the progressive sequence of one example of character deletion in a representation of a document displayed on a personal computing device screen 200, in accordance with an embodiment. In FIG. 3a the input cursor 201 is shown at the point of deletion. In FIG. 2b the operator has touched the 'delete' key or touched for instance the region of a track pad provisioned as the 'delete' key, as in FIG. 1b. A representation of the 'delete' key 204 is shown ghosted above the cursor with the character 's' 203 to be provisionally deleted, and the result of the 'delete' action to be provisionally committed is shown here in a hashed or ghosted form, together with the following characters and words that will be shifted if deletion of the character 's' is confirmed. In FIG. 3c, deletion of the lower case character 's' has been confirmed, and the text has been shifted and rendered in normal form, waiting for the next key stroke at the cursor 201.

FIG. 4 is a representation of the progressive sequence of one example of character insertion tried but aborted in a representation of a document displayed on a personal computing device screen 200, in accordance with an embodiment. In FIG. 4a the input cursor 201 is shown ready. In FIG. 4b the operator has touched the 's' key or touched for instance the region of a track pad provisioned as the 's' key, as in FIG. 1b. The result of inserting the 's' character to be provisionally committed is shown here in a hashed or ghosted form, together with the following characters and words 202 that will be shifted if insertion of the character 's' is confirmed. In FIG. 4c, insertion of the lower case character 's' has been aborted, and the text has been restored, waiting for the next key stroke at the cursor 201.

It is anticipated that this system may benefit from a delay, depending on context. That is, a touch typist may not wish to exercise the system for every character entered or action commanded, but may instead benefit from this system and methods only when hesitating. This delay can be optionally provided in the logic flow of the method, and the length of the delay, if any, can optionally be offered as a user preference among the device control panel screens.

In accordance with an embodiment, a particular advantage of the systems and methods described herein is seen when a character or action is best or necessarily formed or commanded by a multiple key combination. Chordal key input uses multiple key selection exclusively to enter data, or command and control a computing device. But this system has always suffered from the perception and experience that it is difficult to learn and use. Hunt and peck was nearly impossible, until the system and methods proposed here. The systems and methods described herein makes it straightforward to hunt for characters with a simple addition to a chordal key input system, enhancing confidence and learning.

Figure 7:
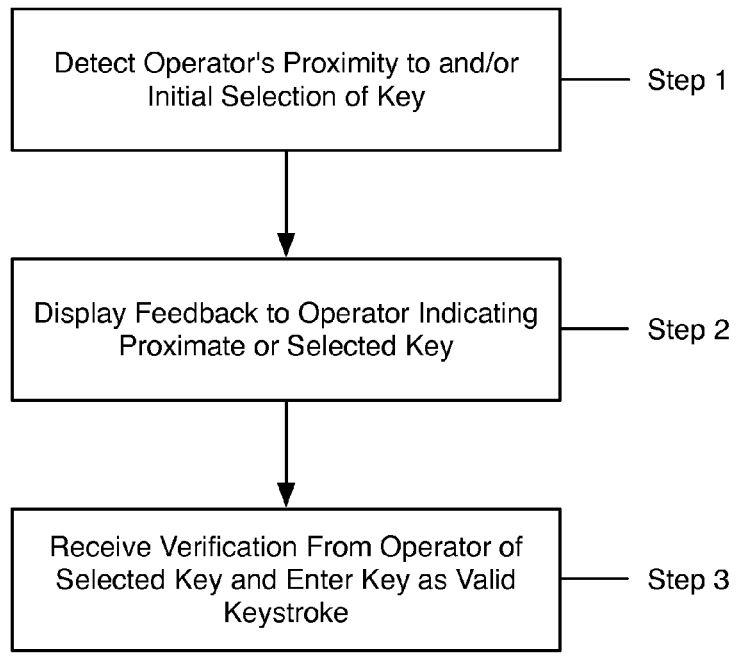
FIG. 7 shows a high level flowchart of a key selection and verification method, in accordance with an embodiment.

FIG. 7 shows a high level flowchart of a key selection and verification method, in accordance with an embodiment.

Figure 8:
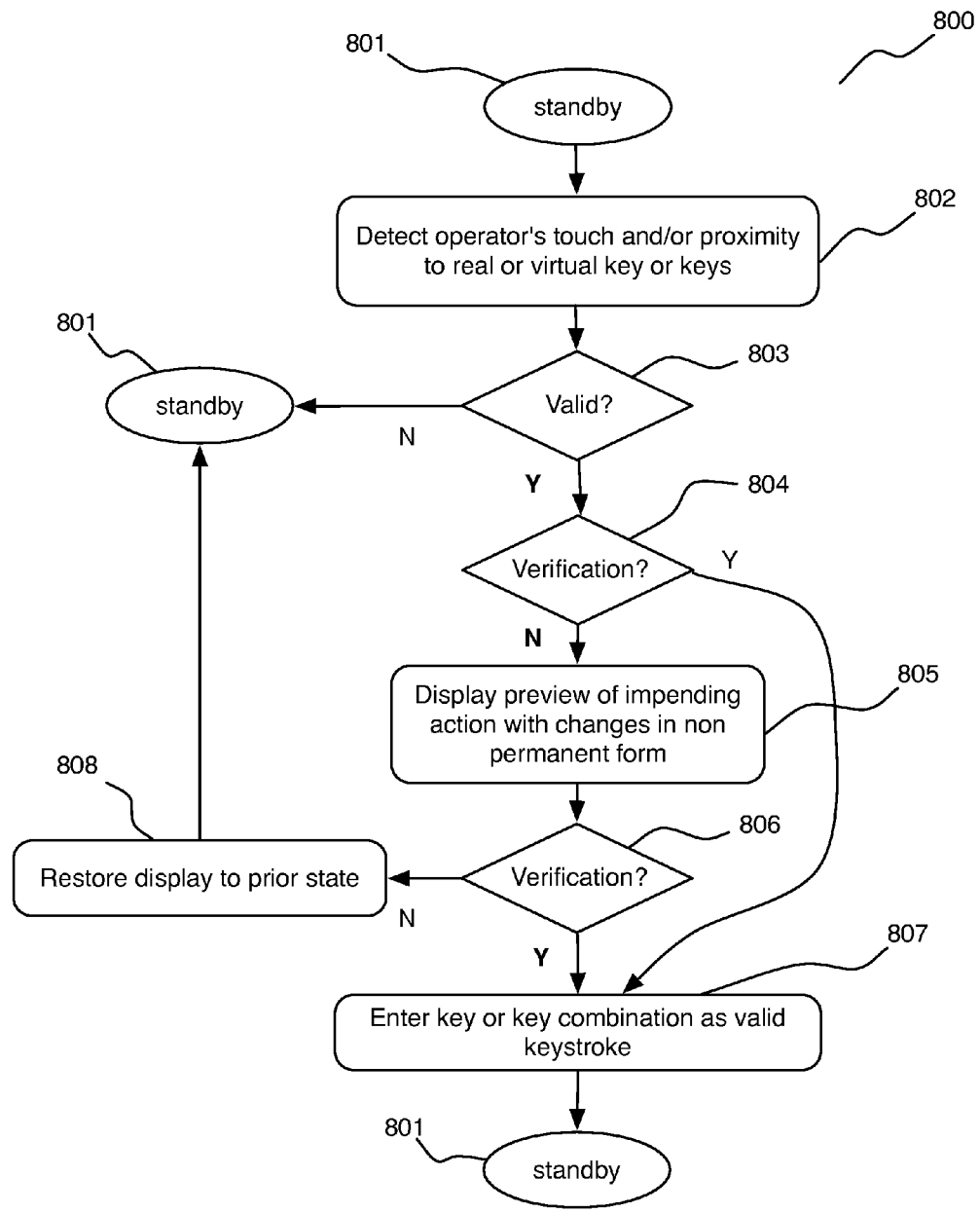
FIG. 8 shows a more detailed flowchart 800 of a key selection and verification method, in accordance with an embodiment, including potential modifications based on the validity of multiple key selections and the possibility of confirming a key combination without preview feedback.

FIG. 8 is a logic diagram notionally representing steps in accordance with one embodiment. The system waits for inputs in standby mode 801, and one of the events it responds to is to detect the touch of single or multiple real or virtual keys at 802. If the key combination sensed is valid at 803, the system evaluates whether it has been confirmed at 804. If not, the system returns to standby 801. If the key combination is confirmed at 804, the system enters it or commits the command indicated at 807. Otherwise, after an appropriate delay, it displays preview feedback of the action about to be committed, together with appropriate changes presented in non-permanent form at 805. If the key combination is now confirmed at 806, it is entered or the associated action is committed at 807. Otherwise, the display indications are restored to their previous state at 808. In either case, the system then returns to standby 801.

To an extent, some key input systems known use schemes in which multiple keys must be simultaneously selected and confirmed to effect some characters or actions, such as a capital letter, many special characters, or special actions that vary from device to device. As described herein, in accordance with an embodiment, the system makes it possible to naturally hunt for characters or actions by touch, and to be confident in the selection and command of those characters or actions, greatly increasing the utility of a personal computing device and associated devices and systems.

FIG. 5 is a visual overview of a multiple key character input step, in this case the registered trademark character ® as rendered on a Macintosh computer, using the two keys 'option' and 'r' keys, in accordance with an embodiment. It should be noted that modifier keys such as option and shift, for two examples, may be depressed or touched at the operator's option. FIG. 5*a* shows the character '®' ghosted on the display 200 with the nominal effects of insertion shown. In FIG. 5*b* shows fingers 303 touching the key combination, and the possibility that the keyboard 300 could be formed from physical keys 301 or a touch surface 302.

FIG. 6 is a visual overview of a 3 key 'chordal' multiple key character input step, in this case the European currency Euro character € as rendered on a Macintosh computer, using the three keys 'option' and 'shift' and '2', in accordance with an embodiment. FIG. 6*a* shows the prospective character '€' 203 ghosted on the display 200 with the nominal effects of insertion shown 202. In FIG. 6*b* fingers 303 touch the key combination, and as in FIG. 6*b* the possibility that the keyboard 300 could be formed from physical keys 301 or a touch surface 302.

In accordance with an embodiment, the improved systems described here include touch and virtual keyboards and keypads. Touch keypads and keyboards can include representations of discrete keys for character input, modification (such as shift for capital letters), and actions (such as delete or cursor moves, or even power on and off). Keys on touch keypads can be activated by proximity, a light touch, or by touch and removal (nominally, a 'tap'). Some touch keypads can confirm a key selection by sensing pressure, or sensing the size of a fingertip, inferring greater pressure and therefore confirmation of the key selection. Some touch key input devices such as keypads and keyboards may include or use exclusively a mechanical switch or switches to detect activation and confirmation, potentially enhancing the detection of finger location and action. With multiple sensors, multiple independent regions can be independently monitored and accept input per region.

In accordance with an embodiment, a touch keyboard or keypad enabled and described herein is an undifferentiated, unmarked touch sensitive surface that can detect the location of the proximity or touch of single or multiple fingers, and which can relay that information to the personal computing system for preview feedback of the character or action that will ensue if the virtual key combination indicated is further depressed or tapped or otherwise confirmed in a natural and familiar way. It is acknowledged that despite the natural advantages offered by this system and method, allowing hunt and peck of keys that are out of sight, or not in the direct line of sight, and that in fact may not be otherwise indicated at all, some learning and accommodation time may be required to find the operation of this system entirely intuitive and natural. Yet it has the elements to enhance the input of characters and selection of actions and commands, and these will soon seem natural and even necessary for a successful personal computing device, game console, portable entertainment device, music player, phone or other communications device, and almost every personal information system people encounter at work, home, traveling, and at play.

In accordance with an embodiment, a variety of key input configurations may now be implemented that may have ergonomic benefit for typing and other applications. One such is a keyboard split and provided on opposite sides of a vertical pedestal, to replace the flat keyboard. The keyboard may use virtual or real buttons, or a combination. In accordance with an embodiment, substantially the same keys would fall under the typist operator's fingers as when the hands are placed in the traditional 'home' position on a standard 'QWERTY' or other language keyboard. The typist operator would hold hands almost together, with the key pedestal between them, with palms oriented vertically instead of the usual flat vertical positions, palms facing each other. Keys would be selected and characters and/or actions formed and entered according to the systems and methods described herein, without requiring a view of the keyboard. This offers a new orientation and configuration for some operators, and an alternate position for those who benefit from changing positions from time to time. This palms-facing position may be less stressful, and therefore more ergonomically beneficial over time, than the traditional keyboard position, when properly designed, positioned, and used.

Figure 18:
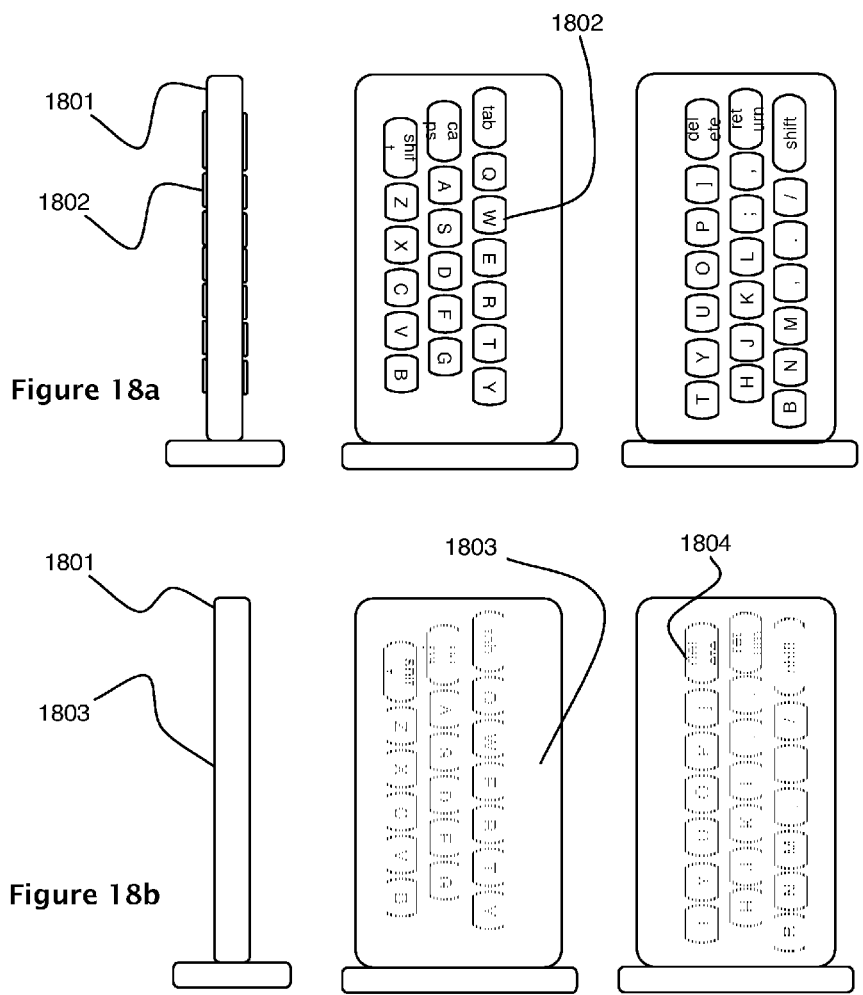
FIG. 18 is a schematic illustration of two variations of a pedestal keyboard, in accordance with an embodiment, one with physical keys, and the other with a nominal partial representation of a virtual keyboard, split and placed on opposite sides of the pedestal, as the keys might be perceived if visible.

FIG. 18 is a schematic illustration of such a 'pedestal keyboard', in accordance with an embodiment. In FIG. 18*a*, most of the keys of a standard western 'QWERTY' keyboard are shown split and provided on opposite sides of a vertical pedestal. In accordance with an embodiment, the keys can be touch sensitive. In FIG. 18*b*, the design is substantially the same, but the keys are virtual, shown in hashed form as they would be perceived if they could be seen. In both cases, as in most keyboard illustrations in this document, a full set of keys is not shown, but it will be understood by one skilled in the art that a full set of keys can be provided for many different purposes, from standard languages, to special languages, to mathematical and arithmetic calculators, to symbolic character systems and other related purposes.

In accordance with some embodiments, a keyboard could be entirely virtual, for instance operated by finger movements in the air, as in a virtual world, using sensors to detect finger movement, such as cameras, radar, lasers, ultrasonic, or other known position, shape, and velocity detection systems. In such embodiment, the method would be the same, but there would be no physical implementation of the keyboard, keypad, or touch screen at all. A selected key or character would be indicated by proximity of a virtual finger to a virtual keyboard, and confirmation would be indicated by a motion and action or actions that represent the depression or other confirmation of a key selection, such as a tap on a touch keypad. The confirmation methods depend on the specific virtual world as developed, but nominally would be conducted, in one example, by slow hand and finger motions for selection, or hunting, and fast short motion of the same finger, for confirmation. Some human interfaces to virtual worlds provide haptic force feedback of encountered virtual objects and situations, such as hard surface, air or water resistance. This is rapidly changing and developing art, with a clear goal to replicate normal waking experience. Haptic feedback may enhance embodiments of the systems and methods described herein, but is not required.

In accordance with an embodiment, a keyboard or keypad depicted on a touch sensitive display screen such as a smart phone or computer tablet LCD panel is a virtual keyboard in one important sense; it only exists and is sensible only while the display is on and active.

In accordance with an embodiment, an undifferentiated touch surface that can detect multiple finger contacts and confirmations used as a keyboard is a virtual keyboard in other ways, with various advantages. First, it has no visual or other indications that it is a keypad. Finding keys is entirely dependent on touch and memory, true touch typing, made more productive and providing confidence with hunting enabled by the touch preview feedback provided by the system, methods, and apparatuses described herein. Second, the function of the touch pad can change utterly in different contexts as the operator's activity flow demands. For instance, the multi touch pad can be used to point like a computer mouse or computer trackpad when no character input is wanted or needed. In another case, the pad can become a keyboard in a different language, naturally and seamlessly as the operator switches between documents authored in different languages, or by command. Third, the keyboard can be sized and arranged to favor each operator. Keys may be spaced differently for large and small hands. Virtual key positions may be individually offset to accommodate detected and learned tendencies for one operator to favor pressing a given area for that character key. Fourth, the simplicity and beauty of a system that has no discrete physical keys provides significant advantages for marketability, manufacturing efficiency and effectiveness, dramatically lower costs, inventory simplification, and reduced need for repair.

If preferred keyboard overlays can be provided, in many different forms familiar to the art, from simple thin plastic contact sheets to thin active electronic displays that change the key and button representations as appropriate.

Other advantages are expected to ensue from using an undifferentiated keypad or keyboard for character input and personal device operation.

In accordance with an embodiment, another application of the systems and methods described herein is for remote control devices, such as hand held television remote controls, or display projection systems, or electronic computer games.

Figure 9:
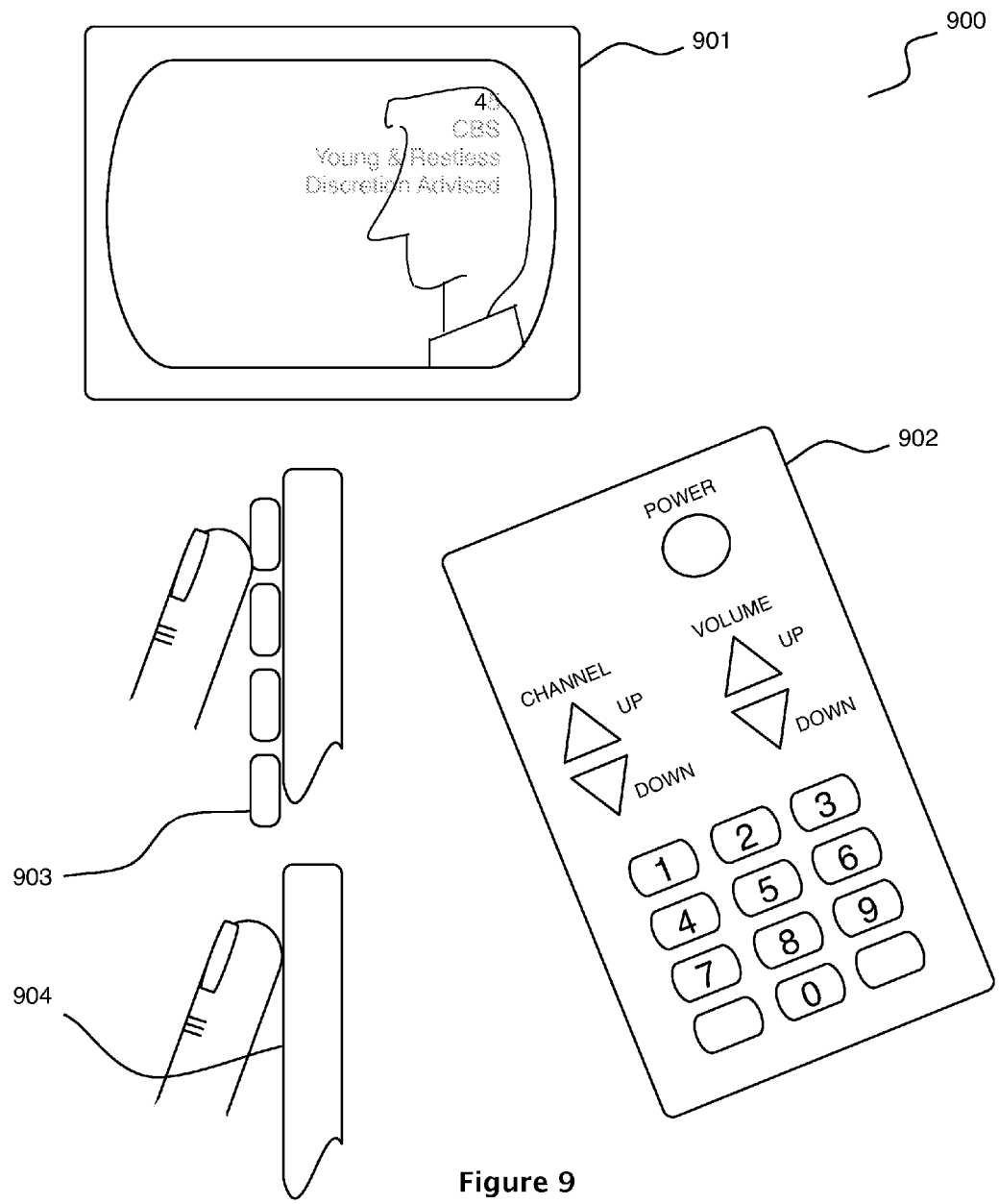
FIG. 9 is a schematic illustration of a television remote control, in accordance with an embodiment, with preview feedback of a channel selection ghosted on the screen.

FIG. 9 is a visual overview of a television remote control 902 as used to search for a different channel on television 901, in accordance with an embodiment. The key 4 has been entered, and the key 5 has been touched, resulting in a channel overview ghosted onto the television display. The remote 902 may be made with physical keys 903 as known to the art, or as virtual keys provided on a touch surface 904 using the system and method described here.

Figure 10:
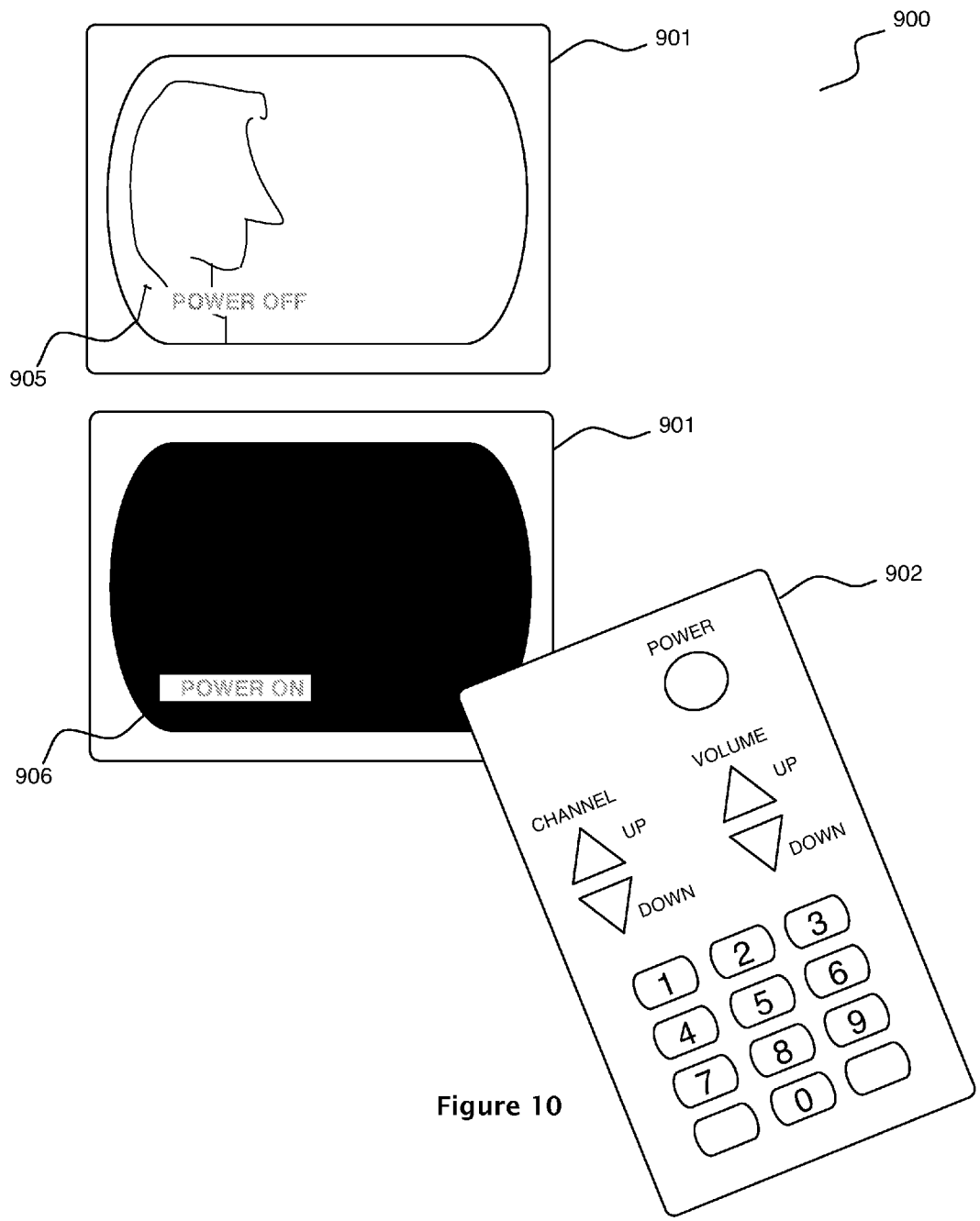
FIG. 10 is a schematic illustration of a television remote control embodiment, in accordance with an embodiment, with preview feedback of turning power on or off ghosted on the screen.

FIG. 10 is a visual overview of a television remote control 902 used to command the power on or off for television 901, in accordance with an embodiment. The single real or virtual button for power can be touched to provisionally turn power OFF 905, if confirmed, or to wake the system from standby power and provisionally turn the power ON 906, if confirmed as described here.

Figure 11:
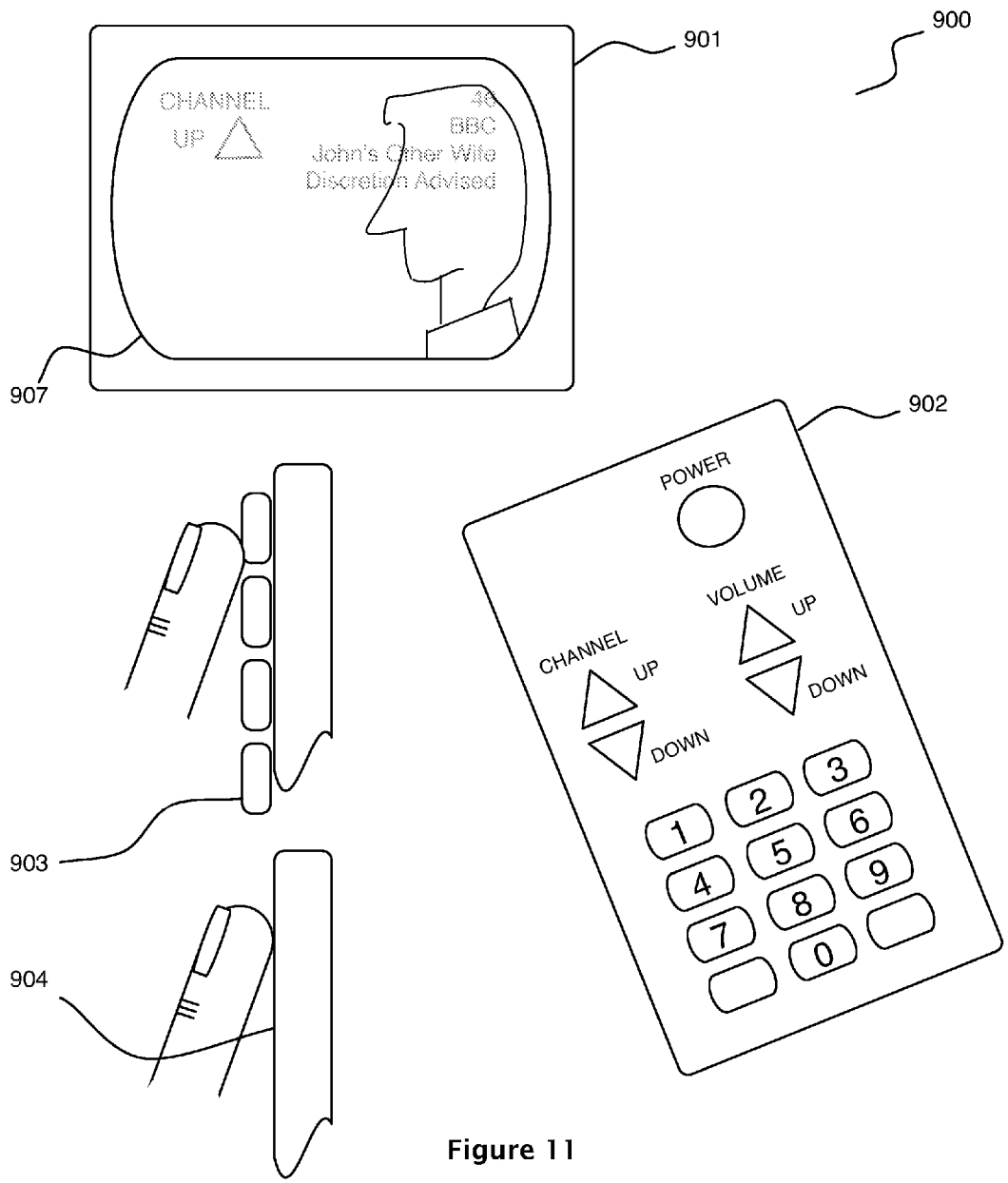
FIG. 11 is a schematic illustration of a television remote control, in accordance with an embodiment, with preview feedback of selection of the next higher channel ghosted on the screen.

FIG. 11 is a visual overview of a television remote control 902 used to investigate the next channel as shown 907 for television 901, in accordance with an embodiment. The real button 903 or virtual button on touch surface 904 for 'CHANNEL UP' has been touched, and the potential result is shown on the television screen 907.

Figure 12:
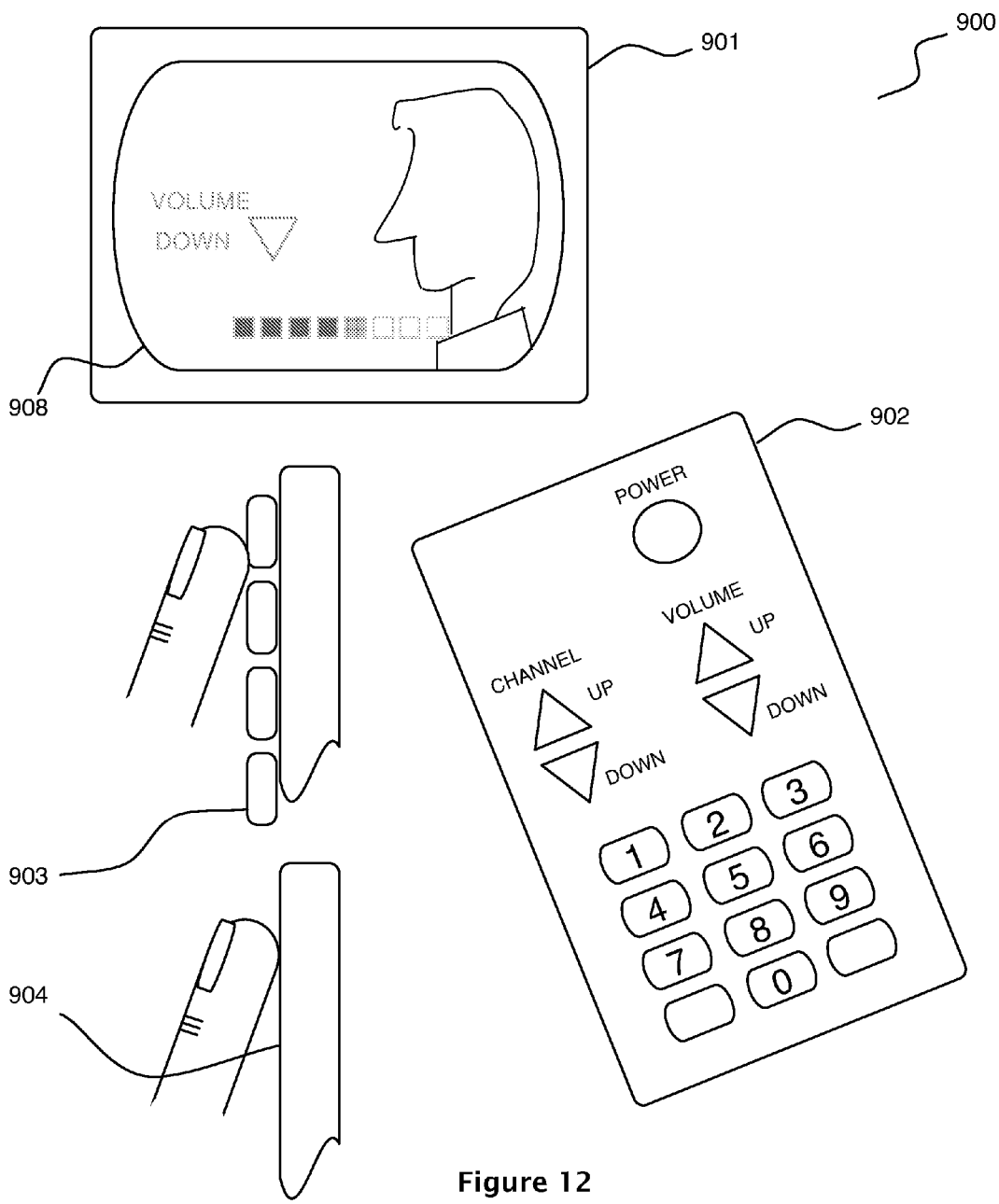
FIG. 12 is a schematic illustration of a television remote control, in accordance with an embodiment, with preview feedback of lowering volume ghosted on the screen.

FIG. 12 is like FIG. 11 a visual overview of a television remote control 902 used to explore the lower volume level as shown 908 for television 901, in accordance with an embodiment. The real button 903 or virtual button on touch surface 904 for 'VOLUME DOWN' has been touched, and the potential result is shown on the television screen 907, waiting to be confirmed or retracted.

FIG. 13 is an illustration of preview feedback provided on a display for prospective input actions, in these cases 'QUIT,' 'SAVE,' and 'CLOSE', in accordance with an embodiment.

In accordance with an embodiment, the systems described herein can be applied to undifferentiated touch surface hand held devices that can change their function and configuration as appropriate, or more simply provide touch sensitive surfaces on discrete keys of conventional remote control devices and game controllers, including the additional possibility of placing buttons and command surfaces out of sight, yet allowing hunting by touch to find and ascertain commands and character input in natural and intuitive ways.

FIG. 16 shows the high level form of two of many hand held game controllers popular in the art. FIG. 16a shows a representation of a computer game controller normally held with two hands, and includes buttons 1604 and joy sticks 1603, with buttons 1602 provided at the front of the controller, usually out of sight. Other controls such as switches and sliders are also often used in such systems. FIG. 16b shows a game controller modeled after a flight side stick controller as found in aircraft cockpits, with two of many possible additional input controls, a fire button 1412 and a side function button 1413. These types of buttons are often beyond view, and as discussed elsewhere in this text they are almost always out of the focus of high resolution sight and attention.

In accordance with an embodiment, the undifferentiated keyboard can be split and placed on the reverse side of a tablet computer, mobile phone, game device, etc, allowing natural access to a full character and command set. For instance the QWERTY keyboard can be split, and each half placed, virtually, on the left and right back sides of a tablet computer that has an appropriate multi-touch surface provided on its back side, opposite the display, which will locate the keys of this familiar keyboard under the fingers of two hands grasping the tablet computer, in approximately the same relative positions as when both hands are placed on the QWERTY keyboard in the classic 'home' position taught in typing classes for decades. One clear exception to this natural arrangement is the space bar, which may best be placed under one or both thumbs near where they naturally fall on the front of the tablet computer, and likewise other touch sensitive control and modification keys, real or virtual, may benefit from placement on the front display side of the tablet computer for operation by the thumbs. Some variations in such details are expected as system providers experiment and learn from the customers in the marketplace, yet still operating within the systems and methods described herein.

FIG. 17 shows features of such a tablet computer 1700, in accordance with an embodiment. It appears similar or equivalent in FIG. 17a to a standard tablet computer, with a touch sensitive display 1701 on the front. But FIG. 17b shows that the back is an undifferentiated touch surface 1702. In FIG. 17c large parts of a virtual keyboard is shown split and provided on the back touch surface 1702, such that the keys normally found under the fingers in the so-called 'home position' of typing would largely be found under the same fingers, when grasped with both hands. Keys and multiple key commands are to be found easily and intuitively, without looking, by hunting, using the art, system, and method described here. Some keys, not shown, may be preferred to be provided on the front surface of the tablet computer, on the touch screen display or by providing additional input mechanisms in the margins between the display and the edge of the tablet.

In related embodiments, a keyboard or keypad can be provided under the fingers of an automobile driver, or an aircraft pilot, or a train engineer or at a ship's crew stations, and the like, in natural positions including many that are normally out of sight. These could include discrete keys provided with touch or proximity sensitive surfaces, or a virtual key set implemented by an otherwise undifferentiated touch input surface that can accept single or multiple touch inputs. This input device would be provided, for instance, on the back side of a steering wheel in a car in the natural position of the fingertips while driving, on the unseen side of a control stick in an aircraft cockpit, and on the back side of a control wheel and other grasped controls in a ship or train. Similar applications will be apparent to those skilled in the art. Buttons and controls have sometimes placed in these positions in known products and devices, but they have not been made touch sensitive to communicate their function, separate from commanding an action.

FIG. 15 shows many such controls in an automotive road vehicle cabin 1500, in accordance with an embodiment. FIG. 15a shows a driver with line of sight to the road 1507, using steering wheel 1506 to guide the vehicle. Overhead controls on a panel 1501 comprise a slide 1503 and buttons 1502. A heads up display 1505 is shown with a phone number 1505 ghosted onto the display in the line of sight 1507. This could also appear on console display 1508 using the systems and methods described herein. Controls panel 1509 includes buttons 1510 and other controls, such as switches, sliders, levers, and knobs. Rotary knob 1511 is shown. All of these controls can be provided with touch sensors to practice the systems and methods described herein, in combination with the displays 1505 and 1508, and aural feedback (not shown), and potentially other augmenting feedback methods as discussed herein. FIG. 15b shows a hand on steering wheel 1508, with touch areas indicated under the driver's fingers. FIG. 15c shows one potential placement of touch sensitive buttons 1512 for additional controls, for instance telephone dialing or cruise control input, at the so-called '2 o'clock' position, according to the systems and methods described herein. A similar set is presumed at the so-called '10 o'clock' position. FIG. 15d shows another position, often used in practice, for control buttons and switches. A paired set of controls is assumed in a similar position on the opposite side. Additionally, the buttons or pads 1512 and 1513 could be undifferentiated touch input surfaces, with control areas provided virtually as shown and specified elsewhere in this text.

In an aircraft cockpit, car cabin, ship's helm, or other vehicle control station, many traditional physical buttons, switches, dials, knobs, levers, sliding controls, throttles, and related manual control mechanisms are often placed above on overhead consoles, or on consoles to the left and right, and in places often out of the direct line of sight. These physical controls will benefit from the systems and methods described herein. Similar benefits will accrue to other control stations, from industrial control rooms, to electrical grid control centers, to space flight mission control centers, and similar applications and situations.

In accordance with many embodiments of the systems and methods described herein, preview feedback can be provided in a way that does not distract from the operation of a vehicle, device, or virtual environment, placing the feedback in the normal field of view in known ways that do not change the focus or concentration of the driver or operator, or optionally or additionally providing the preview feedback in an aural announcement or other method known to those skilled in the art, such as stick shakers in aircraft and seat vibration and pressure in aircraft and cars. Aural preview feedback may for instance be preferred to be provided as a whisper, to differentiate the preview of the action from the confirmation of the action, which may be clear by context, visually or otherwise, or may be provided as fully voiced confirmation of the entry or action.

Figure 14:
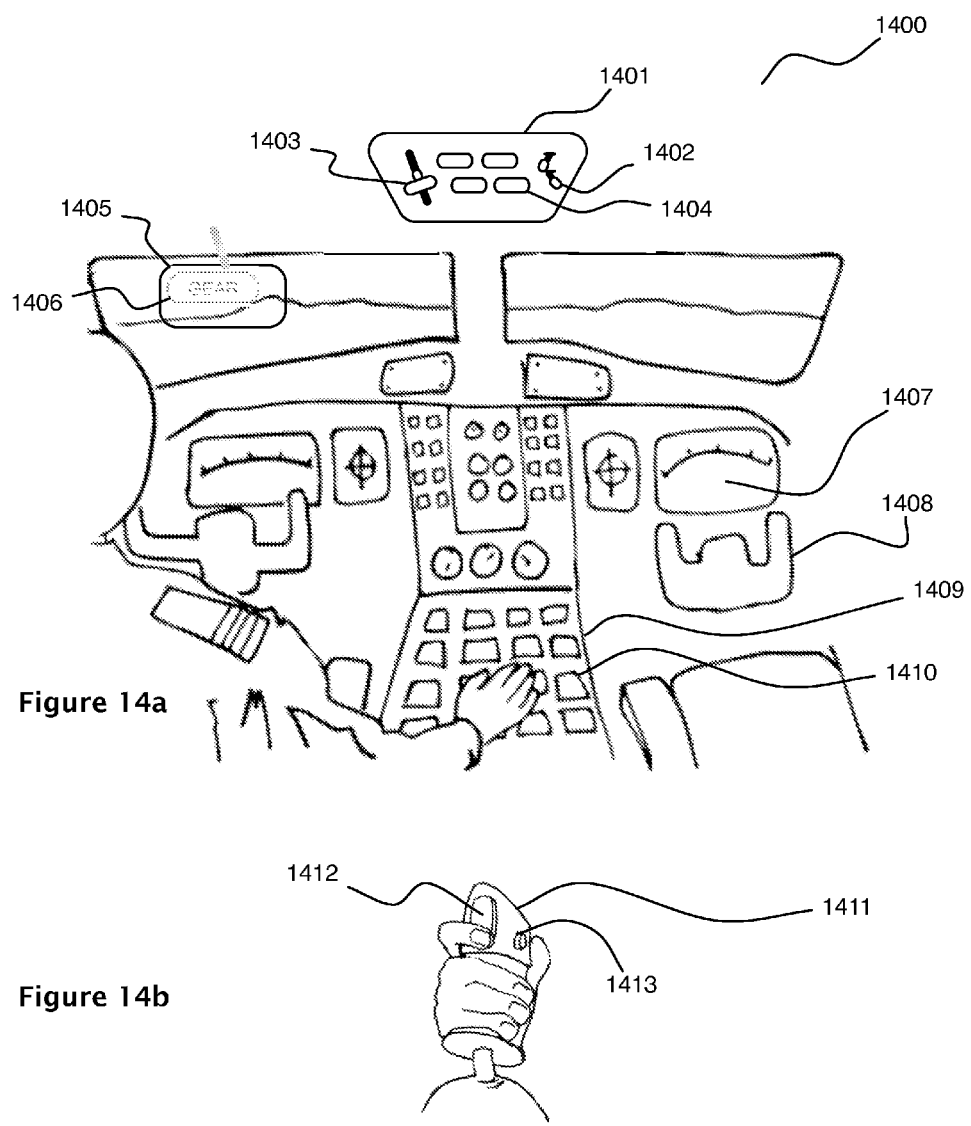
FIG. 14 is an illustration of a pilot in an aircraft cockpit with some of its associated controls and displays, in accordance with an embodiment. A common alternative control side stick is shown, which is very similar to computer game control sticks. A button and trigger is shown on the nominal stick.

FIG. 14 shows a simple representation of a pilot in an aircraft cockpit 1400. FIG. 14a shows a pilot with line of sight to the horizon, using control wheel 1408 to guide the vehicle, in accordance with an embodiment. Overhead controls on a panel 1401 comprise a slide or throttle 1403, buttons 1404, and switches 1402. A heads up display 1405 is shown with preview feedback of a provisional control action 1406 ghosted onto the display 1405. This could also appear on control panel display 1407, its matching display opposite, or other displays in view using the systems and methods described herein. Controls panel 1409 includes buttons 1410 and other controls, such as switches, sliders, levers, and knobs not shown. Such consoles are often provided at both sides of the cockpit as well. Other manual and virtual controls known to the art may also be used. All of these controls can be provided with touch sensors to practice the preview feedback systems and methods described herein, to advantage, in combination with the displays 1405 and 1407 as examples, and optionally aural feedback (not shown), and potentially other augmenting feedback systems and methods described herein. FIG. 14b shows a hand on side control stick 1411, with trigger button 1412 and side button 1413 for optional commands. Certified side stick controllers for commercial aircraft as in 1411 are modeled and produced for game controllers and simulations, including aircraft, ground vehicle, and ship simulations among others, including so-called virtual worlds, such that the description and operation of the two are substantially interchangeable, even if the actual articles are not. Flight controls such as side stick 1411 and control wheel 1408 are often supported with a number of switches, triggers, joy sticks, and other controls familiar to an operator of a hand held controller for a computer game. Often the commands and system settings commanded using these controls is vital to the safe or successful operation of the vehicle. Preview feedback as in the systems and methods described herein, can therefore be a substantial help to increase certainty and confidence in the selection and confirmation of commands and inputs for steering, directing, and operating such vehicles and their associated systems.

In accordance with an embodiment, controls can now be made more intuitive and useful in many positions in a cabin or cockpit, other than touch screen navigation and control consoles. For instance, seat position control buttons can be touch sensitive, and indicate the pending action by visual or aural preview, without taking that action until positive confirmation is commanded. Seat position buttons are given as an example because they are usually out of sight of the driver. Other command and control selectors in the cockpit or cabin can likewise benefit from the systems and methods described herein, as will be readily apparent to one skilled in the art.

The art of key and button input includes many methods and technologies learned over the years that are little appreciated by most customers and users of the devices that are covered here. Key bounce rejection, rejection of key combinations that are not allowed, ignoring key input when it is not appropriate, correct key selection under conflicting or multiple touch inputs, spelling correction and suggestion, auto completion, and many related technologies are known to the art and are needed to provide a successful, familiar, intuitive, and cost effective product to the marketplace today and in the future. For the most part, we refer to these aggregate technologies as 'confirmation,' and we expect that the crucial arts underlying that simple word will continue to develop and proliferate, without changing what is taught here.

One market that may benefit from these innovations is the international character market. For example, many Asian character systems number in the many thousands, and therefore do not lend themselves to key input with a limited number of keys. Chordal key input systems may be able to render a usable fraction of the character set needed for the great majority of communications, with the rest provided via other variations, selectors, or modes, within the system and methods presented here.

In accordance with an embodiment, using systems and methods described herein, a chordal key system can be made to be intuitive and immediate, with a preview of the character formed as the key combination is touched, providing confidence with the ability to hunt for the desired character. A system that constructs characters from multiple sequential selections, potentially including multiple chordal key selections, real or virtual, may enable a greatly improved system for creating and recording the productive fraction of the many characters of the Asian character/writing systems known, in addition to so-called Western character sets.

INDUSTRIAL APPLICABILITY

Embodiments of the invention have potential uses in a wide range of industrial applications, including, but not limited to the following:

Personal computer devices, laptops, and notebooks.
Portable data devices, digital assistants, and PDA's that could use an additional mechanism of entering data beyond the basic means provided through touch-sensitive keypads and stylized data entry languages.
Portable accessories such as cellular telephones and entertainment consoles.
Vehicle control stations such as car cabins, aircraft cockpits, ship's helms, etc, that have many buttons, switches, throttles and other controls in addition to touch screen display consoles.
Industrial and other fixed control stations such as electric power control rooms and manufacturing monitoring and control centers, and spacecraft mission control centers and the like.
Ergonomic keyboards for computers and other machines that allow the user to rest the hands in an intuitive and comfortable manner, and achieve high rates of data entry.
Medical devices that have a display screen incorporated within a surgical and/or investigative instrument.
Consoles and stations that benefit from hiding or enclosing the keyboard or keypad, such as an ATM automated teller machine or keyless door entry.
Military control devices that present a display to the operator, coupled with a rugged data input mechanism.

The above examples are given to illustrate the wide variety of potential uses and applications of the invention. It will be evident to one skilled in the art that the invention is not limited to those variations described above, but that many other variations, implementations, and applications can be developed within the spirit and scope of the invention.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A key sensing interface for one of a laptop computer, personal digital assistant, or other electronic device, comprising:
    a display located on the laptop computer, personal digital assistant, or other electronic device, and wherein the display is viewable to a user of the device, for use in displaying a document having characters in a regular format;
    an undifferentiated trackpad with the capacity to detect and transmit to the electronic device the location of multiple simultaneous touches, functioning as a virtual keyboard or keypad with a plurality of virtual keys, each mapped to a region of the trackpad;
    a sensing mechanism, which includes logic associated with each of the plurality of virtual keys, for determining which of the plurality of virtual keys on the virtual keyboard or keypad the user is currently selecting and is about to enter as characters within the document;
    a feedback mechanism for communicating feedback to the user, while the user is using the keys to select and enter characters within the document, by successively denoting, as a succession of interim ghosted, shimmering, colored, or other differently formatted characters, a preview of that character indicated by a key or plurality of keys currently selected by the user, including,
        while the user is selecting from the plurality of discrete keys to enter characters within the document,
        displaying a preview of the character indicated by the current selection of key or plurality of keys, at a current location in the document, as displayed on the display, as an interim displayed, ghosted, or other differently formatted character, and without requiring the user to look at the keyboard;
    a verification mechanism allowing the user to confirm or abort their key selection; and
    a key input mechanism recognizing the confirmation as a valid key stroke or input, while the user is typing in the document, wherein that same interim ghosted, shimmering, colored, or other differently formatted character, if confirmed, is then entered into the current location in the document in its regular format, as the valid key stroke or input.

2. The interface of claim 1 wherein each of the plurality of virtual keys on the virtual keyboard or keypad include a touch-sensitive portion of the virtual key, and wherein said determining is based either on the user's finger pressure on the virtual key to be selected, or on a proximity detection of the user's fingers relative to the virtual key.

3. The interface of claim 1 wherein said feedback includes an audible notification to the user of the key to be selected, or another form of audible notification related to that key.

4. A method of providing a key sensing interface for one of a laptop computer, personal digital assistant, or other electronic device, comprising:
    providing a display located on the laptop computer, personal digital assistant, or other electronic device, and wherein the display is viewable to a user of the device, for use in displaying a document having characters in a regular format;
    providing a virtual keyboard or keypad, disposed on an undifferentiated touch sensitive surface, which includes a plurality of virtual keys;

providing a sensing mechanism, which includes logic associated with each of the plurality of virtual keys, for determining which of the plurality of virtual keys on the virtual keyboard or keypad the user is currently selecting and is about to enter as characters within the document;

providing a feedback mechanism for communicating feedback to the user, while the user is using the keys to select and enter characters within the document, by successively denoting, as a succession of interim displayed, ghosted, or other differently formatted characters, a preview of that character indicated by a virtual key or plurality of virtual keys currently selected by the user, including, while the user is selecting from the plurality of virtual keys to enter characters within the document, displaying a preview of the character indicated by the current selection of virtual key or plurality of virtual keys, at a current location in the document, as displayed on the display, as an interim ghosted, shimmering, colored, or other differently formatted character, and without requiring the user to look at the keyboard;

providing a verification mechanism allowing the user to confirm or abort their key selection; and providing a key input mechanism recognizing the confirmation as a valid key stroke or input, while the user is typing in the document, wherein that same interim ghosted, shimmering, colored, or other differently formatted character, if confirmed, is then entered into the current location in the document in its regular format, as the valid key stroke or input.

* * * * *